United States Patent [19]
Raleigh et al.

[11] Patent Number: 5,809,422
[45] Date of Patent: Sep. 15, 1998

[54] DISTRIBUTED MICROCELLULAR COMMUNICATIONS SYSTEM

[75] Inventors: Gregory G. Raleigh, El Granada; Michael A. Pollack, Cupertino, both of Calif.

[73] Assignee: Watkins Johnson Company, Palo Alto, Calif.

[21] Appl. No.: 611,600

[22] Filed: Mar. 8, 1996

[51] Int. Cl.$^6$ .................................................. H04Q 7/00
[52] U.S. Cl. .......................... 455/449; 455/450; 455/444
[58] Field of Search ..................................... 455/449, 444, 455/447, 429, 443, 446, 450–453, 455, 509, 525, 561, 562; H04M 11/00; H04Q 7/00

[56] References Cited

U.S. PATENT DOCUMENTS

| | | | |
|---|---|---|---|
| 4,797,947 | 1/1989 | Labedz | 455/33 |
| 4,932,049 | 6/1990 | Lee | 379/60 |
| 5,067,173 | 11/1991 | Gordon et al. | 359/152 |
| 5,175,867 | 12/1992 | Wejke et al. | 455/33.1 |
| 5,187,806 | 2/1993 | Johnson et al. | 455/15 |
| 5,193,109 | 3/1993 | Lee | 379/60 |
| 5,243,598 | 9/1993 | Lee | 370/95.3 |
| 5,317,623 | 5/1994 | Sakamoto et al. | 455/449 |
| 5,333,178 | 7/1994 | Norell | 455/461 |
| 5,339,184 | 8/1994 | Tang | 359/124 |
| 5,375,007 | 12/1994 | O'Neill | 359/152 |
| 5,448,753 | 9/1995 | Ahl et al. | 455/422 |
| 5,463,671 | 10/1995 | Marsh et al. | 379/56.1 |
| 5,481,546 | 1/1996 | Dinkins | 370/329 |
| 5,521,961 | 5/1996 | Fletcher et al. | 455/444 |
| 5,542,107 | 7/1996 | Kay | 455/513 |
| 5,546,443 | 8/1996 | Raith | 455/449 |
| 5,548,806 | 8/1996 | Yamaguchi et al. | 455/441 |
| 5,550,898 | 8/1996 | Abbasi et al. | 455/449 |
| 5,555,260 | 9/1996 | Rinnback et al. | 370/347 |
| 5,625,672 | 4/1997 | Yamada | 455/449 |
| 5,640,678 | 6/1997 | Ishikawa et al. | 455/449 |
| 5,655,216 | 8/1997 | Kato et al. | 455/449 |

*Primary Examiner*—Tommy P. Chin
*Assistant Examiner*—Vu Le
*Attorney, Agent, or Firm*—Flehr Hohbach Test Albritton & Herbert LLP

[57] ABSTRACT

A distributed microcellular communication system comprised of a plurality of subcells arranged within one or more conventional cells. The distributed microcellular communications system includes one or more remote site stations, each of which transmits and receives information signals over an assigned set of communications channels within an associated subcell. Each remote site station includes a wideband RF receiver network within which information signals received from mobile units are converted into reverse link digital information signals. Also disposed within each remote site station is a remote communications link transceiver for transmitting the reverse link digital information signals over a communications link to the central base station, as well as for receiving forward link digital information signals from the central base station. The central base station includes a central communications link transceiver for receiving the reverse link digital information signals delivered over the communications link, as well as for transmitting the forward link digital information signals. The central base station is disposed to process the call information inherent within the forward and reverse link digital information signals in the manner required by standard cellular protocols. In an alternate implementation the remote site station further includes a channelizer for selecting a set of the reverse link digital information signals corresponding to the assigned set of communications channels, and may also include a bank of demodulator for demodulating the set of reverse link digital information signals.

14 Claims, 11 Drawing Sheets

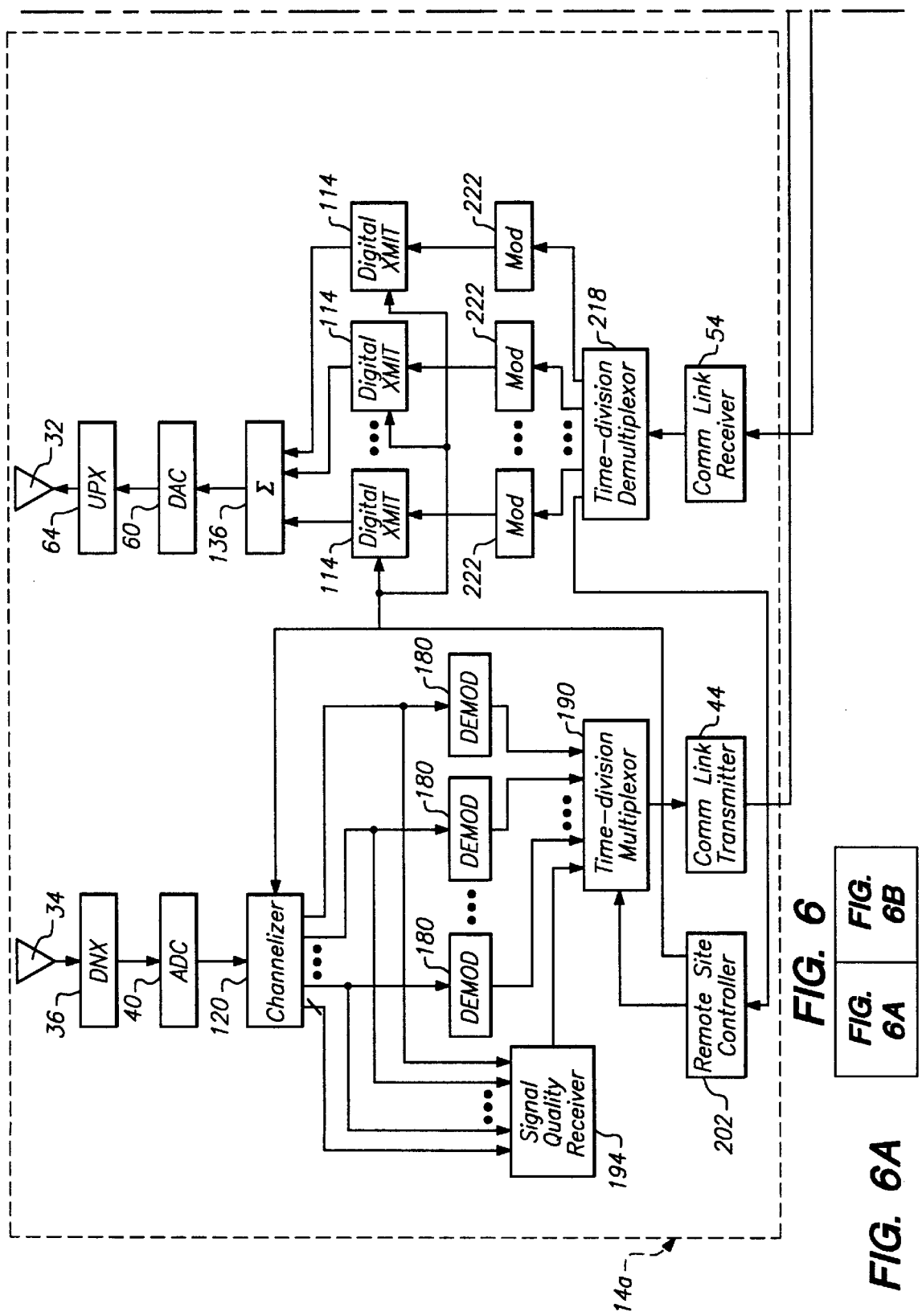

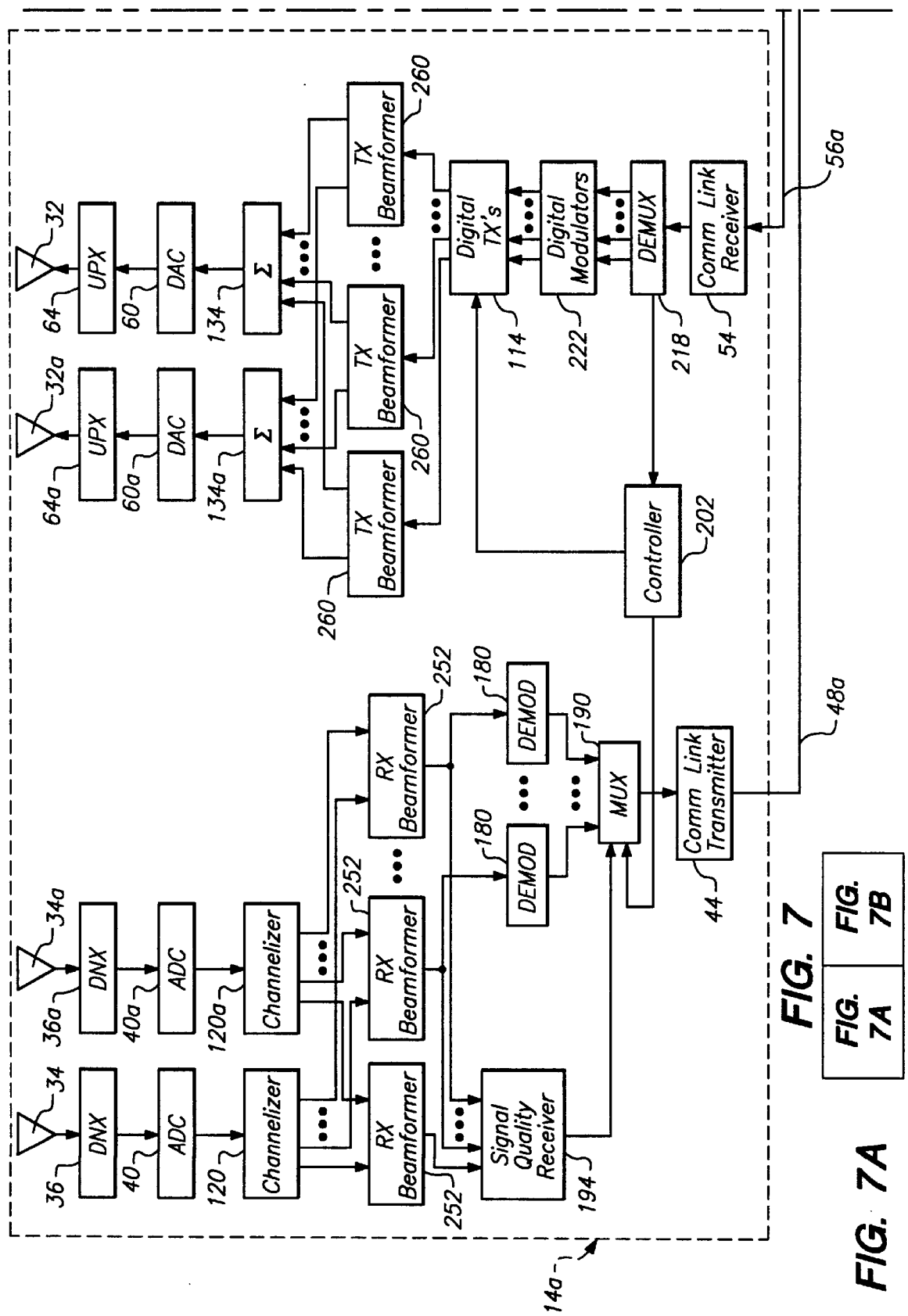

DISTRIBUTED MICROCELLULAR COMMUNICATIONS SYSTEM

FIELD

The present invention relates generally to cellular telephone systems. More particularly, the invention relates to a distributed digital communication system incorporated within cellular telephone systems.

BACKGROUND

Cellular telephone networks facilitate mobile communications within a given geographic area by dividing the area into contiguous regions, or "cells". Each cell includes a base station, located at a "cell-site," which services mobile units within the cell. In a typical cellular network, each cell is assigned a set of transmission frequencies with which to operate. The sets of frequencies assigned to adjacent cells are different, and are typically not repeated except when cells are separated by a sufficiently large "re-use" interval that interference problems are unlikely to occur.

Within densely populated metropolitan regions, the overall capacity of a cellular system may be limited by the relatively small set of frequencies assigned to each cell. Furthermore, the coverage of the single cell-site base station within each cell may be compromised by fading and blockage of the transmitted signal energy.

One conventional approach to increasing system call carrying capacity involves dividing each original cell within the system into a set of smaller cells. This entails servicing each of the new smaller cells using a conventional base station. Usually, the number of channels at each base station remain unchanged, since the original frequency plan can be applied to a new, scaled-own, cell layout. It follows that since the area covered by each new cell is smaller than the original cell, and since the number of channels available to each base station is the same, the overall system capacity (channels per unit area) is increased. Although this reduction in cell size advantageously increases capacity, an increase in the frequency of calls handed-off between base stations will generally occur. That is, each mobile user may be expected to cross the boundaries of the smaller cells more frequently than the boundaries between the larger original cells.

The handoff process involves switching the mobile unit from its existing operating frequency to a new frequency allocated to the cell into which the mobile unit is entering. The handoff process is generally coordinated by a mobile telephone switching office (MITSO) linked to each cell-site base station, and is initiated by the MTSO in response to a request from a base station. A base station requests hand-off when the quality of a communication channel assigned to a given mobile unit drops below a predefined threshold, which typically indicates that the mobile unit is nearing a boundary between cells. The MTSO queries the base stations surrounding the base station requesting the handoff in order to ascertain which, if any, of the surrounding base stations are capable of establishing communication of suitable quality on a new channel. If the MTSO determines that one of the surrounding base stations is so capable, the MTSO orders the mobile unit to switch to the new channel and passes control to the selected base station. In this way each channel within the cellular system may be used at a plurality of cell sites simultaneously, and the system is thereby enabled to support a number of users exceeding the number of system channels.

Nonetheless, since the capacity of each MTSO to control handoffs and otherwise process calls is limited, efforts have been made to augment system capacity without subdividing existing cells and deploying additional base station equipment. For example, in U.S. Pat. No. 4,932,049 to Lee, there is described a cellular telephone system in which a distributed antenna set configuration is deployed within each cell as a means of dividing the cell into a plurality of zones or sectors. Each cell contains a plurality of antenna sets arranged and configured in an effort to limit propagation of signals substantially to one of the plurality of zones or sectors within the boundaries of the cells. The zones or sectors are substantially less in area than the area of the cell.

In Lee's system all of the antenna sets are coupled to a common set of transmitters and receivers, and a zone switch is used to selectively couple the transmitters and receivers to the antenna units. This selective coupling is coordinated by a controller located at the cell site, which causes the antenna best able to service a mobile unit on a given channel to be connected to the transmitter/receiver pair associated with the channel. Switching among antenna sets is facilitated by polling the signal strength received at each antenna set from a given mobile unit, and connecting/disconnecting antenna sets accordingly.

In distributed antenna systems of the type described by Lee, transmission on the frequency assigned to a mobile unit is confined to the zone or sector within which is present the mobile unit. As the mobile unit moves into a new zone or sector within the cell, a 'soft' handoff occurs whereby transmission to the mobile unit is switched from the antenna set within the previous zone to the antenna set within the new zone during which time mobile unit continues to transmit/receive on the same frequency channel. Frequency handoff (i.e., "hard" handoff) occurs only upon the mobile unit moving to another cell.

The number of zones or sectors into which each cell serviced by a distributed antenna system may be divided is not limited, but increasing the number of zones does not increase the capacity of the 'distributed' cell unless additional channels are assigned to the cell. The assignment of additional channels to a distributed cell is made possible by confining transmission from each antenna set to the surrounding zone, thereby decreasing the frequency re-use interval between neighboring distributed cells. Nonetheless, distributed antenna systems contemplate only soft hand-offs between the zones of a cell, and hence all of the zones must share all of the channels within the channel set assigned to the cell. It follows that increasing the number of zones within each cell does not increase capacity unless the number of channels assigned to the cell is correspondingly increased.

It would thus be desirable to provide a system in which capacity is increased by dividing each cell into a plurality of subcells in a manner not requiring that each subcell use an identical set of channels. The implementation of "intra-cell" hard handoffs between the subcells would make possible such assignment of different channel sets to the subcells. Accordingly, capacity could be increased commensurate with the extent of subdivision of the cell into subcells.

Cellular systems using distributed antenna arrangements, such as the system proposed by Lee, generally require that the antenna set within each zone captures the entire cellular spectrum. The entire analog cellular spectrum, after perhaps being shifted to a different analog frequency band, is transmitted over a wideband communications link to the base station. Another exemplary distributed antenna system of this type is described in European Patent Application No. 0 391 597, published on Oct. 10, 1990, submitted by AT & T.

In the AT & T system, optical fiber analog carriers are analog modulated with mobile radio channels throughout the optical fiber network connecting the distributed antenna sites. The entire available set of channels, i.e., the entire allocated cellular band, is transmitted from the base station to the distributed antenna sites, and vice-versa.

Quite obviously, transmission of the entire analog cellular band over a wideband communications link to each distributed antenna site is inefficient in view of the fact that only a fraction of the band is radiated at each antenna site. Likewise, it is inefficient to transmit the entire received spectrum from each remote antenna site back to the base station, given that only a fraction of the frequency channels received at each remote antenna site carry valid information. A system disposed in which only frequency channels actually used by a remote antenna site or the like are transmitted to and from the base station could be expected to advantageously reduce the communication link bandwidth required for such information exchange.

Utilization of an analog communication link may also increase the likelihood that weak signals within the analog cellular spectrum received at each antenna may become lost in the noise of the communications link during propagation to the base station via the analog link. For example, in a cell coverage area of any appreciable radius it is expected that the signals received from mobile units in different parts of the cell may differ in power by as much as 50–75 dB. In the case of optical fiber communication links between the base station and antenna sites, dynamic range is often limited in practice to less than 40 dB. Accordingly, if two signals separated in power by somewhat more than 40 dB (e.g., by 60 dB) were transmitted from the antenna site to the base station over the optical fiber communication link, the base station would be incapable of recovering the weaker signal. While certain analog communication links realized using media other than optical fiber may afford a larger dynamic range, the use of analog techniques to transfer a wideband analog spectrum between to and from remote antenna sites is likely to introduce some form of signal distortion.

It would thus be desirable to obviate the need for use of such wideband links by providing a system in which a reduced volume of data is required to pass between the base station and each remote site.

SUMMARY

The present invention provides increased capacity within a cellular communication system by deployment of a network of remote site stations within each standard cell (hereinafter 'macrocell') of the cellular system, each remote site station comprising one or more sets of antennas and associated transceiver units. This increased capacity is advantageously achieved without increasing the number of base stations in communication with the cellular system's mobile telephone switching office (MTSO), thereby obviating the need for expensive retrofit or modification of the MTSO when the microcellular system is deployed in a conventional cellular system.

In an exemplary embodiment of the invention, there is provided a distributed microcellular communication system in which a plurality of subcells are arranged within each macrocell. The distributed microcellular communications system includes one or more remote site stations, each of which has a remote radio transceiver for transmitting and receiving information signals over an assigned set of communications channels within an associated subcell.

Each remote site station includes a wideband RF receiver network within which information signals received from mobile units are converted into reverse link digital information signals. Also disposed within each remote site station is a remote communications link transceiver for transmitting the reverse link digital information signals over a communications link to the central base station. The remote communications link transceiver also receives forward link digital information signals from the central base station.

The central base station includes a central communications link transceiver for receiving the reverse link digital information signals delivered over the communications link, and for transmitting the forward link digital information signals. The central base station is disposed to process the call information inherent within the forward and reverse link digital information signals in the manner required by the standard protocols of an existing cellular system (e.g., AMPS, GSM), or as required by other protocols which may be developed in the future. Conventional circuitry is employed to interface the central base station to the MTSO.

In another exemplary embodiment of the present invention, the remote site station further includes a channelizer for selecting a set of the reverse link digital information signals corresponding to the assigned set of communications channels. In the general case the selected set of channels will include far fewer channels than the number of channels in the set assigned to the macrocell in which the remote site station is located. The remote site station may still further include a bank of demodulators for demodulating the set of reverse link digital information signals to produce a set of demodulated reverse link digital information signals. The remote communications link transceiver then transmits the channelized or demodulated reverse link digital information signals to the central base station.

According to another aspect of the invention, a bank of digital modulators are deployed within the transmit section of the remote site station. Each digital modulator is disposed to modulate a carrier signal using one of the forward link digital information signals, with the result that the bank of digital modulators produces a plurality of modulated carrier signals. A bank of digital transmitters are provided for translating the frequency of each of the plurality of modulated carrier signals in order that each said signal occupies an assigned frequency channel within a digitized forward link transmission spectrum. The digitized forward link transmission spectrum is converted to an analog spectrum, upconverted to the RF cellular transmission band, and transmitted from the remote site station.

In accordance with yet another aspect of the invention, reverse link transmissions may be gathered from each mobile unit by a plurality of the remote site stations in order to minimized the likelihood that calls are dropped during the hand-off process. In conventional cellular systems, when a mobile unit approaches a boundary between cells the separation from the base station with which it is communicating approaches a maximum. Consequently, the forward and reverse communication links to and from the mobile unit tend to deteriorate due to increased path loss. In order to prevent deterioration of the communication links to such extent that the call is dropped, it becomes necessary for the cellular system to quickly decide whether a hand-off should occur. The decision of when to undertake the hand-off process is further complicated by the presence of slow fading in the communications channel. Such slow fading can corrupt hand-off decisions by affecting the mobile unit signal strength received at hand-off candidate base stations during the polling process.

The present invention overcomes many of the difficulties associated with hard hand-off between remote site stations by monitoring reverse link transmission from a given mobile unit at a plurality of surrounding base stations. Since this allows the strongest signals to be selected for processing, degradation of the quality of the reverse link is minimized when the mobile unit becomes proximate a cell boundary. Similarly, the channel statistics accumulated by the plurality of remote site stations monitoring reverse link transmission from a given mobile unit may be of assistance in selecting the base station(s) in the best position to effectively transmit on the forward link to the mobile unit. By employing macrodiversity techniques to monitor the communication links between a plurality of base stations and a given mobile unit, the present invention facilitates improved communication quality and well-informed hand-off decisions.

The architecture of the distributed microcellular communications system of the invention has also been designed to enable diversity reception at each remote site station. By collecting reverse link signals using two or more antennas deployed at a remote antenna site, Rayleigh (i.e., fast) fading of the communication channel may be mitigated. The signals received from the two or more remote site station antennas are combined at the remote site station, and the resultant diversity signal transmitted back to the central site station over the communications link. This use of diversity combination techniques at the remote site station allows the communication link to the central base station to be of a bandwidth no greater than that required to carry the information to and from a single remote site station antenna element. In contrast, conventional distributed antenna systems typically require that the reverse link signals received by multiple remote antennas each be conveyed to a central base station over the same communication link. Hence, the complexity and expense of conventional systems is increased due to the need for deployment of a wideband communication link between the base station and the multiple remote antennas.

BRIEF DESCRIPTION OF THE DRAWINGS

Additional objects and features of the invention will be more readily apparent from the following detailed description and appended claims when taken in conjunction with the drawings, in which:

DETAILED DESCRIPTION

The present invention is designed to be deployed either (i) within an existing cellular system as a means of economically increasing capacity, or (ii) as an independent high-capacity cellular system. The present invention provides a distributed microcellular communications system disposed to operate transparently with respect to the mobile telephone switching office (MTSO) of the existing cellular system. That is, the distributed microcellular system is configured so as to be capable of deployment in the absence of significant modification to the existing cellular system, and is designed to allow increased capacity to be achieved without requiring that enhancements be made to the processing resources elsewhere within the system. As is described below, the inventive microcellular system contemplates that each cell serviced by an existing cellular base station (hereinafter referred to as a "macrocell") be partitioned into a plurality of subcells.

Figure 1A:
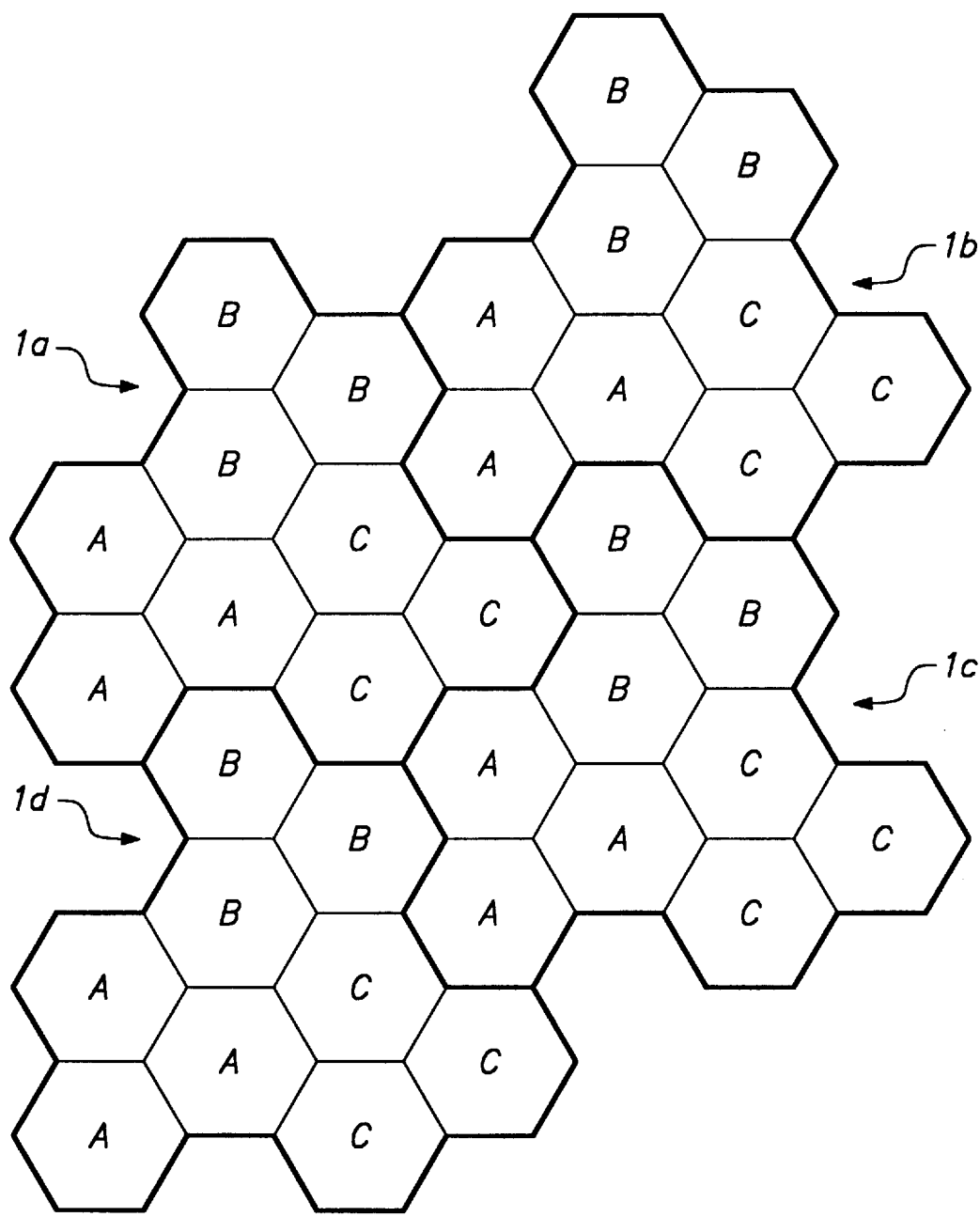
FIG. 1A is an illustrative representation of a plurality of standard hexagonal macrocells.

Referring to FIG. 1A, there is shown a set of four contiguous macrocells $1a$–$1d$ of a cellular communication system of the present invention. Each macrocell $1a$–$1d$ is partitioned into nine subcells, each of which is assigned one of three channel sets {A,B,C}. In particular, three contiguous subcells within each macrocell $1a$–$1$ are assigned to operate using channel set A, three subcells are assigned for operation upon channel set B, and the remaining three subcells operate upon channel set C. As is described hereinafter, hard hand-off techniques are used to transfer calls between the subcells as a means of facilitating utilization of the three different channel sets {A,B,C} within each subcell. This advantageously allows each macrocell to be partitioned into a large number of subcells while maintaining a high degree of frequency re-use.

Figure 1B:
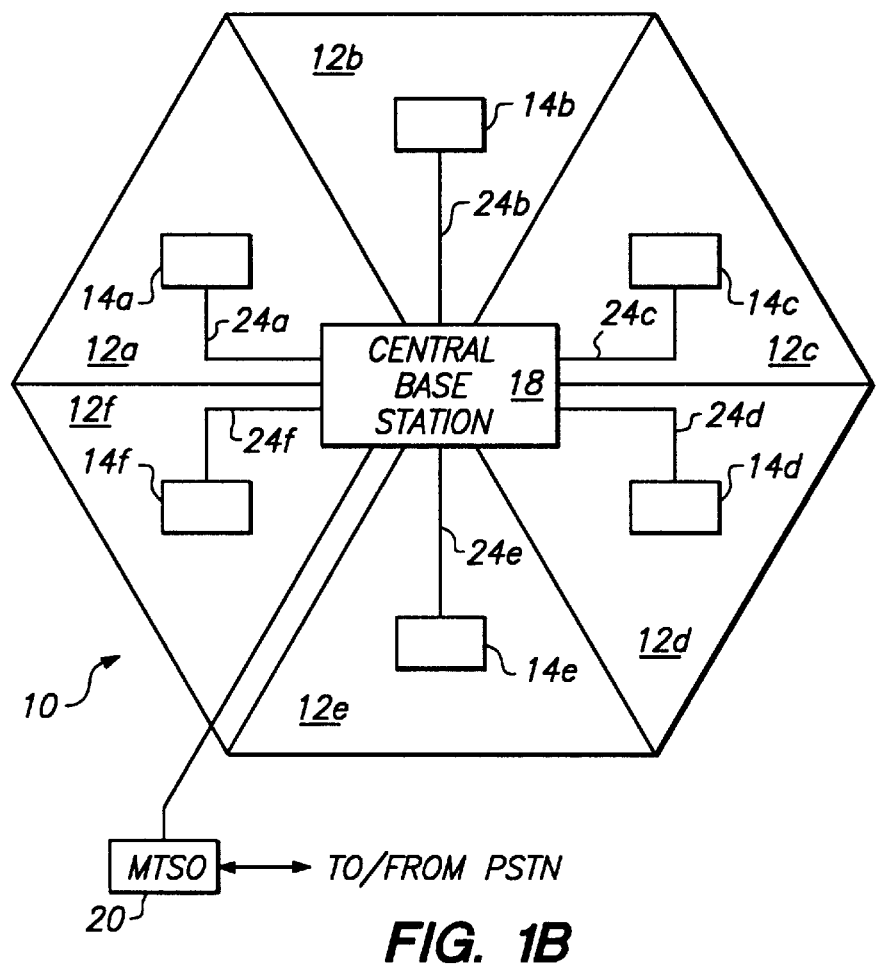
FIG. 1B is an illustrative representation of a standard hexagonal macrocell which has been partitioned into a set of six subcells.

Referring now to FIG. 1B, an illustrative representation is provided of a standard hexagonal macrocell 10 which has been partitioned into a set of six subcells $12a$–$12f$. Since each remote site station $14a$–$14f$ is of substantially identical design, only remote site station $14a$ will be described in greater detail. The six subcells $12a$–$12f$ are respectively serviced by a set of six remote site stations $14a$–$14f$, each of which are coupled to a central base station 18. Except to the extent otherwise indicated, central base station 18 comprises a conventional cellular base station disposed to be controlled by an MTSO 20. Base station 18 is linked to the MTSO 20 through a conventional interface line 22 (e.g., a T1 line, line of sight microwave link, or optical fiber). Similarly, the MTSO 20 is interfaced in the usual way with the public switched telephone network (PSTN).

Figure 1C:
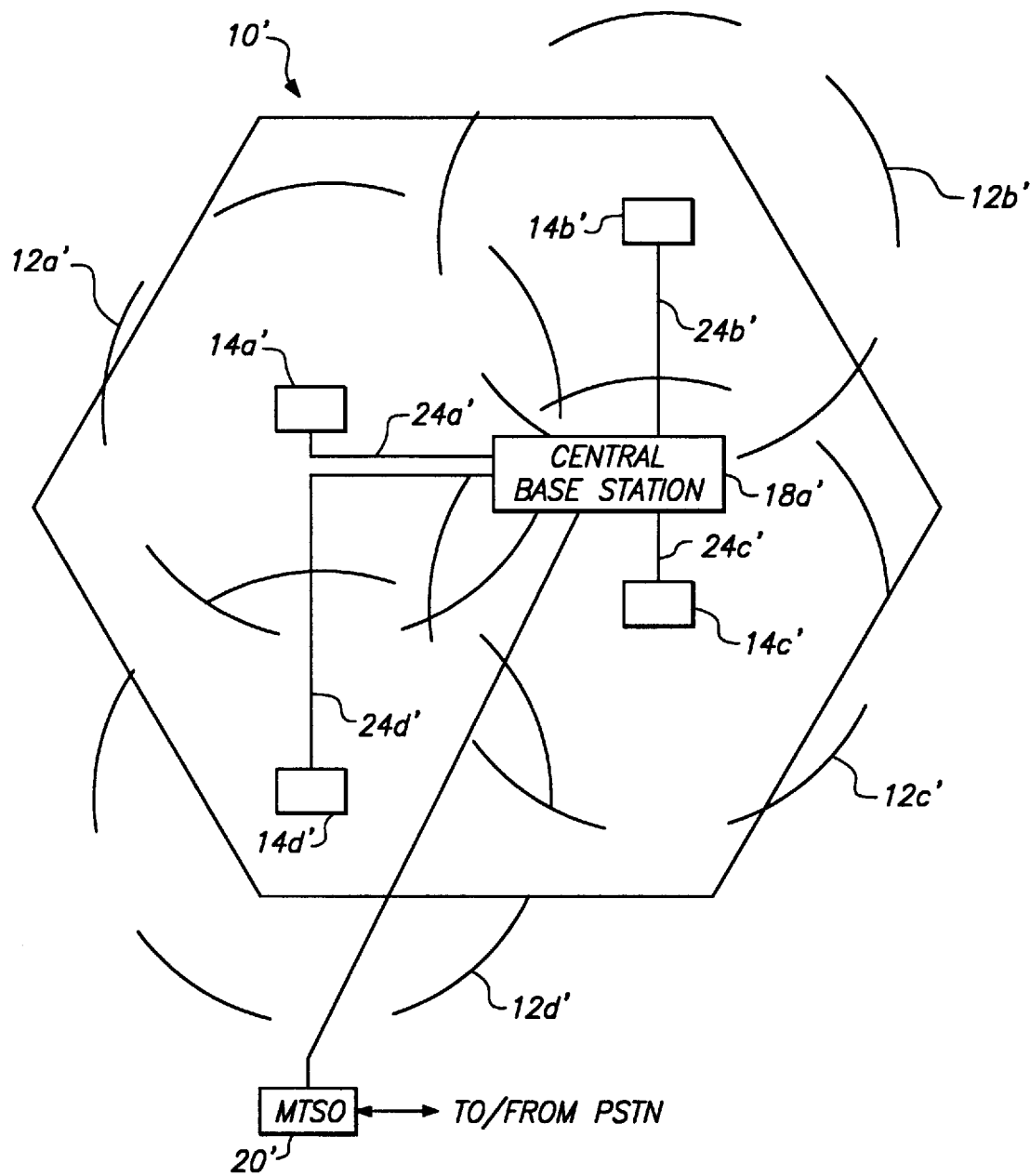
FIG. 1C is an illustrative representation of a standard hexagonal macrocell which has been partitioned into a set of six subcells.

It should be understood that the number of subcells into which each macrocell is divided will be dependent upon the desired overall system capacity. In this regard FIG. 1C depicts a macrocell 10' which has been partitioned into a set of four subcells $12a'$–$12d'$, in which are respectively located remote site stations $14a'$–$14d'$. In FIG. 1C, primed reference numerals are used to identify system elements performing substantially similar functions as those elements identified with corresponding reference numerals in FIG. 1B. In accordance with the invention, increased capacity to service mobile users is achieved through deployment of a network of remote site stations 14a–14f (FIG. 1B) within each macrocell. The increased capacity afforded by the present invention arises from a reduction in the frequency re-use interval between macrocells. By employing hard hand-offs between the groups of subcells within each macrocell operative using different channel sets (see FIG. 1A), any desired frequency re-use interval can be achieved.

The remote site stations 14a–14f collectively provide radio coverage to the geographic area encompassed by the macrocell 10, and are respectively in communication with the central base station 18 through communication links 24a–24f. The communication links 24a–24f may be realized using a variety of interconnection technologies (e.g., coaxial cable, optical fiber, or line-of-sight optical or microwave links). As is described in further detail below, in alternate embodiments of the invention the remote site stations 14a–14f are configured to perform signal processing functions of varying degrees of complexity. Accordingly, the nature and quantity of the information carried by the communication links 24a–24f between the central base station 18 and the remote site stations 14a–14f will be dependent upon the particular signal processing operations executed at the remote site stations 14a–14f. Although in the exemplary embodiment of FIG. 1B the central base station 18 does not provide radio coverage to a subcell associated therewith, it is understood that the base station may readily be configured with a radio transceiver capable of radio communication with mobile units (not shown) within a surrounding subcell. That is, in alternate embodiments the central base station 18 may be implemented to function as a remote site station while continuing to provide central control to the other remote site stations.

In a first preferred embodiment, each remote site station 14a–14f is equipped with a wideband transceiver network operative to frequency translate cellular band signals to and from digitized intermediate frequency (IF) representations of the cellular band signals. This results in digitized, baseband representations of the cellular "forward" and "reverse" links being carried by the communication links 24a–24f. Specifically, the digitized forward link signals are transmitted from the central base station 18 to the remote site stations 14a–14f via the communication links 24a–24f, and the digitized reverse link signals propagate in the opposite direction.

In a second preferred embodiment, each remote site station 14a–14f is provided with a channelizer designed to select only certain of the digitized reverse link signals among the complete set of frequency channels within the cellular band. The particular set of channels selected by the channelizer is specified by the central base station, and includes all channels currently in use within the subcell in which the channelizer is located. In addition, the channelizer may select channels in use in other subcells in order to support other processing or monitoring functions within the central base station. The channel signals selected by the multiplexer are multiplexed into a frequency band smaller than that occupied by the entire digitized reverse link cellular frequency band, and the multiplexed signals transmitted over the communication links 24a–24f to the central base station 18. On the forward link, the central base station 18 multiplexes the signals for the selected channels onto the communication links 24a–24f. Each remote site station 14a–14f demultiplexes the signals sent by the central base station, and passes the demultiplexed signals through a wideband upconversion network for transmission from the remote site station's antenna.

In a third preferred embodiment, each remote site station 14a–14f is not only provided with a channelizer, but also includes a set of demodulators for demodulating each selected reverse link signal to a "digital voice" (e.g., DSO) signal. This allows the digital voice signals to be multiplexed into a narrow frequency band, thereby further reducing the requisite bandwidth of the communication links 24a–24f from each remote site station to the central base station 18. On the forward link, the central base station 18 provides to each remote site station 14a–14f the set of digital voice signals to be broadcast over the channels assigned to the remote site station. After demultiplexing the digital voice signals provided thereto, each remote site station uses the demultiplexed digital voice signals to modulate baseband carrier signals. The modulated baseband carrier signals are then passed through a wideband upconversion network, and transmitted by the remote site station's antenna.

In order to facilitate proper system operation, certain control information is exchanged between the remote site stations and the central base station. This control information is multiplexed with the digital voice signals on the communication links 24a–24f. For example, the central base station may multiplex, with the forward link digital voice signals, control information informing a remote site station which RF transmit frequency corresponds to each digital voice signal sent to the remote site station. This facilitates dynamic allocation of frequencies among the subcells comprising a given macrocell, and may be employed to reduce the likelihood of co-channel interference between adjacent subcells. Other features and advantages of the present invention are discussed below in connection with the detailed description provided for each preferred embodiment.

The present invention is disposed to be implemented within any of a number of different types of cellular telephone systems. These include existing analog Advanced Mobile Phone Service (AMPS) cellular networks, as well as various digital multiple access systems: frequency division multiple access (TDMA), code division multiple access (CDMA), and time division multiple access (IDMA). Although the present invention is capable of being incorporated within these and other cellular telephone systems, the exemplary embodiment described hereinafter is directed toward an AMPS implementation consisting of frequency modulated (FM) channels at kHz spacings. Those skilled in the art aware that each AMPS frequency channel can be subdivided into three TDMA digital channels, or alternately that a combination of AMPS and TDMA channels could be supported.

Figure 2:
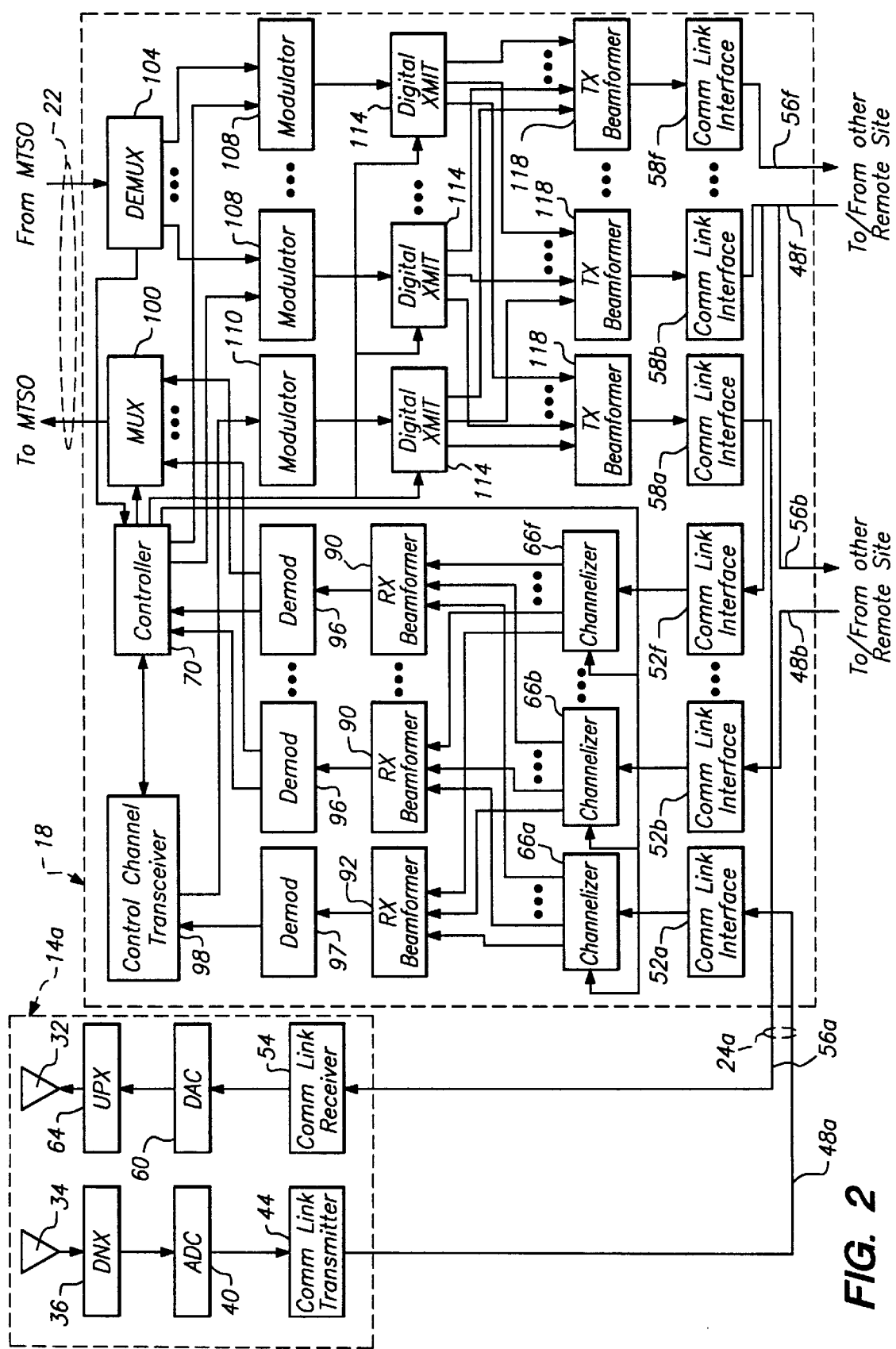
FIG. 2 provides a block diagrammatic representation of a central base station linked to a remote site station disposed within a subcell.

Turning now to FIG. 2, a block diagrammatic representation is provided of one embodiment of the central base station 18 and remote site station 14a. Again, each remote site station 14a–14f is assumed to be of substantially identical design, and hence the configuration of only one remote site station 14a is depicted in detail.

The remote site station 14a is seen to include TX and RX antennas 32 and 34 for transmitting and receiving signals (e.g., within the AMPS forward and reverse channel spectra) to and from mobile units (not shown). Those skilled in the art will realized that the TX and RX antennas 32 and 34 could be replaced with a single antenna and diplexer. The signals received by RX antenna 34 are applied to frequency downconverter (DNX) 36. The DNX 36 is operative to translate the reverse channel spectrum of the received signals to a lower frequency range. For example, in an exemplary implementation an AMPS system A reverse channel spectrum from 825–835 MHz containing 333 channels is translated by DNX 36 to the 0.5–10.5 MHz band.

The downconverted reverse channel spectrum is sampled by analog to digital converter (ADC) 40 at a sampling rate of at least twice the highest frequency contained within the output of the DNX 36. In the exemplary AMPS System A implementation, this corresponds to a theoretical minimum sampling rate 21 MHz, and in practice 25 MHz might be used. The digital samples (e.g., 12-bits per sample) produced by ADC 40 are provided in the form of a stream of digital words over a parallel data bus to a reverse channel communication link transmitter 44.

The reverse channel communication link transmitter 44 includes a parallel to serial converter operative to convert the 12-bit samples received from the ADC 40 to a serial bit stream. In the exemplary embodiment the serial bit stream from the serial to parallel converter is provided to a reverse link line 48a of communications link 24a. When the reverse link line 48a is realized as an optical fiber, the reverse channel communication link transmitter 44 includes a laser transmitter disposed to be modulated by the data from the ADC 40. The modulated optical output from the laser transmitter is applied to the reverse link line 48a for transmission to a first reverse channel communication link receiver 52a within the central base station 18. The central base station 18 further includes reverse channel communication link receivers 52b–52f for receiving similar modulated optical signals from the remote site stations 14b–14f, respectively.

The remote site station further includes a forward channel communication link receiver 54 operative to receive a forward channel digital data stream from a forward link line 56a of communication link 24a. When the forward link line 56a is realized as an optical fiber, the receiver 54 comprises an electro-optical detection network such as a photo-diode detector. Likewise, a first forward channel communication link transmitter 58a comprised of a laser transmitter may be used to transmit the forward channel digital data stream over the forward link line 56a. Other forward channel communication link transmitters 58b–58f likewise transmit forward channel digital data streams to the remote site stations 14b–14f, respectively.

It is understood that the forward and reverse link lines 48a and 56a of communication link 24a may comprise transmission media other than optical fibers (e.g., coaxial cable), or may be replaced by microwave or other point-to-point links. Accordingly, the specific implementation of the forward and reverse channel communication link transmitters/receivers will be dependent upon the medium of the communications link 24a.

Within the remote site station 14a, the communication link receiver 54 converts the serial data stream received over the communications link 24a to 12-bit digital data samples, and relays the forward channel digital data stream to a digital to analog converter (DAC) 60. In an exemplary embodiment, the forward channel digital data stream comprises a digitized, intermediate frequency (e.g., 0.5 MHz to 10.5 MHz) replica of the forward channel spectrum to be transmitted by the TX antenna 32. The corresponding intermediate frequency analog waveform produced by the DAC 60 is applied to a wideband frequency upconverter (UPX) 64, and is therein translated to the forward channel spectrum of a particular cellular system. For the specific case of AMPS System A, the forward channel spectrum transmitted by TX antenna 32 extends from 870 MHz to 880 MHz.

Referring again to FIG. 2, the digitized frequency-downconverted replica of the reverse channel spectrum is provided at an exemplary bit rate of 300 Mbps (12 Msps×12 bits/sample) by the communication link receiver 52a to a first base station channelizer 66a. The central base station 18 further includes channelizers 66b–66f similarly coupled to the communication link receivers 52b–52f, respectively. The channelizer 66a functions to extract the individual signals corresponding to each frequency channel present within the digitized, frequency-downconverted reverse link channel spectrum provided by the communication link receiver 52a. The extracted frequency channels are divided into separate, parallel data streams, each of which possesses a signal bandwidth consistent with the channel spacing of a particular cellular system (e.g., 30 kHz for AMPS). The sample rate of each extracted channel is sufficiently high to satisfy the Nyquist criterion (e.g., 260 ksps for a 30 kHz AMPS channel), but will typically be appreciably less than the sample rate into the first base station channelizer 66a (e.g., 25 Msps).

The first base station channelizer 66a may be programmed by the base station controller 70 to extract a specific set of desired channels present within the digitized spectrum provided by the communications link receiver 52a. For example, in a specific implementation a frequency re-use factor of four is employed between macrocells, thereby resulting in approximately one-fourth of the available frequency channels being assigned to each macrocell (e.g., 78 channels per macrocell).

Assuming each macrocell to be divided into four subcells, it follows that each subcell is allocated nineteen voice channels and a shared control channel. This results in each base station channelizer 66 being programmed to extract the twenty channels assigned to the subcell from the digitized reverse-channel spectrum received from the associated remote site station.

It is observed that in the specific embodiment of FIG. 2, the RX beamformer 90 associated with a given subcell is provided with information from the channelizers associated with subcells adjacent to the given subcell. This requires that each channelizer extract from the reverse-channel spectrum provided thereto not only the channels assigned to its associated subcell, but also the channels assigned to the subcells adjacent its associated subcell. In alternate embodiments, each channelizer may be programmed to extract all of the channels assigned to a particular macrocell.

Each channelizer 66a–66f includes a separate digital filter network for extracting, from the high-speed (e.g., 25 Msps) data stream provided thereto, each of the channels specified by the base station controller 20. The passband of each digital filter network is commensurate with the channel spacing of the reverse link channels (e.g., 30 kHz), and spans one of the frequency channels within the frequency-downconverted reverse link spectrum (e.g., 0.5–10.5 MHz).

Figure 3:
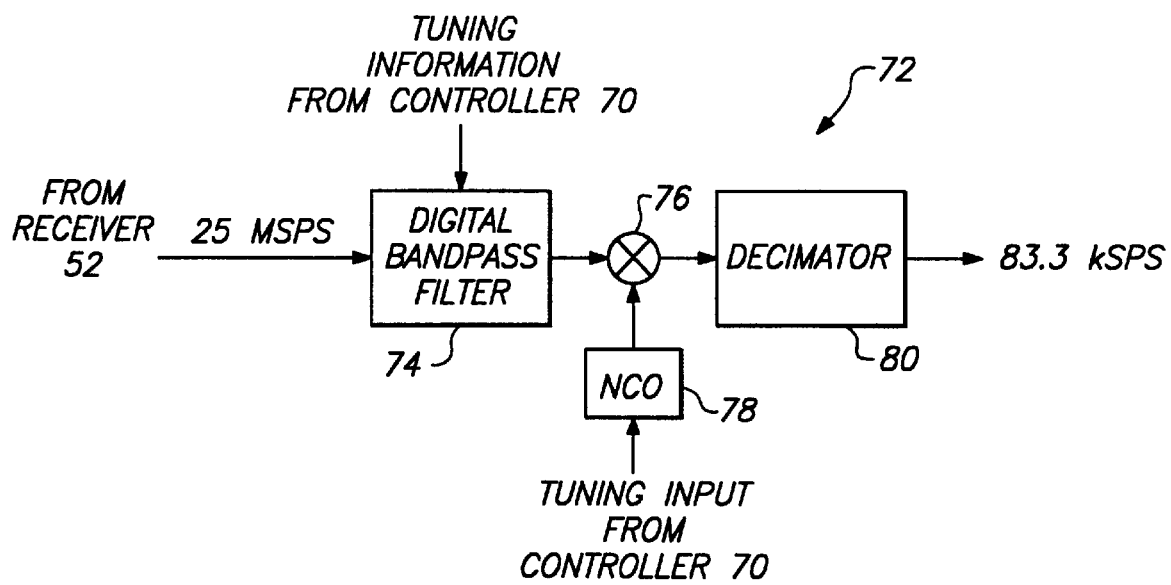
FIG. 3 shows a block diagram of an exemplary digital filter network suitable for incorporation within the channelizers deployed in the central base station and/or remote site stations.

Turning now to FIG. 3, a block diagram is provided of an exemplary digital filter network 72 suitable for incorporation within the channelizers 66a–66f. The filter network includes a digital bandpass filter 74 of 30 kHz bandwidth, preferably realized as a finite impulse response (FIR) filter. The filtered output from the digital bandpass filter 74 is then applied to a multiplier 76, within which it is frequency translated to digital baseband via multiplication with a complex sinusoid. The complex sinusoid, which is of a frequency equal to the center frequency of the bandpass filter 74, is generated by a numerically-controlled oscillator 78. As is indicated by FIG. 3, a decimator 80 is operative to reduce the exemplary 25

Msps rate of the baseband output of the multiplier 76. The decimator 80 reduces this rate by a predetermined factor, the value (e.g., 300) of which is selected to prevent aliasing by causing the resultant output sample rate (e.g., 83.3 KHz) to become equal to at least twice the exemplary 30 kHz channel bandwidth.

Referring again to FIG. 2, a set of N receive (RX) beamformers are each disposed to receive the channelized data stream produced by each channelizer 66a–66f corresponding to one of N reverse-link voice channels. Additionally, RX beamformer 92 is provided the data stream from each channelizer 66a–66f corresponding to an RECC channel, which is a time-division multiplexed control channel. Each RX beamformer 90 is designed to enhance signal quality by using various techniques to weight and combine the data streams from different remote site stations corresponding to the same reverse link channel. For example, in a simplified implementation only the data stream of the highest signal quality is weighted by a factor of "1", and every other stream is nulled by weighting with a factor of "0". When so configured, the RX beamformer essentially operates to implement "selection diversity" combining selecting only a single reverse-link data stream.

Within each RX beamformer 90 there exist a plurality of signal quality determination circuits, each of which measures the quality of the reverse-link data streams received from one of the channelizers 66a–66f. The results of the signal quality measurements determine the manner in which the streams of the same frequency from the channelizers 66a–66f are weighted by each RX beamformer 90. In the exemplary embodiment the stream of highest quality is weighted by a factor of "1", and the remaining streams of the same frequency by a factor "0". This results in the combination of the weighted reverse-link data streams output by each beamformer 90 comprising the single stream from the subcell best suited to sustain communication with a given mobile unit.

Received signal quality may be determined based upon, for example, total signal power received within the frequency channel in question. However, because the signal power measurement cannot distinguish between power from the desired user and power from interfering users, this technique is best suited for systems within which the expected interfering signal power is expected to be low within all subcells of a macrocell. Other techniques for determining received signal quality can be used as well, including those which rely upon calculation of the SINR at each of the inputs to the beamformer.

The RX beamformers 90 may also be designed such that more than a single reverse-link data stream is assigned a non-zero weighting factor. This results in the output of each RX beamformer comprising a weighted combination of the reverse-link data streams provided thereto. In this implementation the signal weighting and combining performed by the RX beamformers 90 may be viewed as constituting adaptive receive antenna beamforming among the remote site stations. Accordingly, receive beamforming techniques designed for use with co-located antenna arrays may be utilized in the present embodiment to optimize signal reception by the set of remote site stations within a given macrocell. As a specific example, for systems including slow-moving mobile units it is expected that use of a "constant modulus" adaptive beamforming algorithm within the RX beamformers 80 will enhance signal reception in a multipath signal environment.

It has been found that both fast (Rayleigh) fading, as well as slow (log-normal) fading, occurring at remote sites separated by relatively large distances (e.g., >300 yards) tends to be largely uncorrelated. Thus, combining signals from remote sites in the RX beamformers 90 is expected to be able to diminish the severity of both fast and slow fading. In the preferred embodiment each RX beamformer 90 adapts its signal weighting at a rate which is responsive to fast fading signal components. This may advantageously reduce or even eliminate the need for employment of microdiversity reception techniques at each remote site station as a means of mitigating fast fading.

The inclusion of the RX beamformers 90 within the central base station 18 also aids the base station controller 70 in determining when to request that the MTSO initiate handoff of a mobile unit to another macrocell. By monitoring the signal quality (e.g., average received power level, signal-to-noise ratio, fading depth and/or duration, etc.) of the composite frequency modulated carrier from one RX beamformer 90, the base station controller 70 is able to determine whether the remote site stations are collectively able to produce a useable signal on the frequency channel corresponding to that beamformer. This is so because each remote site station is provided the opportunity to contribute to the composite frequency modulated carrier produced by each RX beamformer 90. It follows that if the quality of the composite signal drops below a minimum quality threshold for a given period of time, the base station controller 70 may conclude that the remote site stations are unable to, either singly or in combination, produce acceptable signal quality using the signal energy received from a given mobile unit. Hence, there is no need to separately "poll" each remote site station prior to requesting the MTSO to initiate handoff of the mobile unit to another macrocell.

The composite frequency modulated carriers from the set of RX beamformers 90 and 92 are provided to a corresponding set of reverse-link demodulators 96 and 97, respectively. Each demodulator 96 extracts a digitized waveform, similar in format to a DSO voice signal, from the composite frequency modulated carrier provided thereto. In an exemplary AMPS embodiment, the demodulated digital waveform produced by each demodulator 96 is comprised of an approximately 8 kHz stream of 8-bit samples. The 8-bit samples primarily comprise digitized voice information but, during periods in which signaling is taking place over the reverse voice channel, the 8-bit samples will also comprise digital signal information. In the exemplary embodiment each reverse voice channel digital message is preceded by a predefined (e.g., 37-bit) dotting sequence, thereby allowing each demodulator 96 to discriminate between voice channel data and digital messages. Digital messages are provided to the controller 70. The demodulated digital waveforms from the demodulator 96 are multiplexed by a T1 multiplexer 100 into a serial bit stream, which is forwarded to the MTSO 20 over a communications link to the MTSO from the base station. The demodulator 97 similarly demodulates the output produced by RX beamformer 92, and provides the resultant baseband control waveform (e.g., RECC) to a control channel transceiver 98.

The control channel transceiver 98 is disposed to process the forward (FOCC) and reverse (RECC) control channels in accordance with the applicable cellular standard. In particular, the control channel transceiver 98 interprets RECC messages received from remote sites 14a–14f during the processing of calls in the manner contemplated by the applicable cellular standard. The control channel transceiver 98 also generates control messages transmitted by the remote sites 14a–14f over the FOCC.

Referring again to FIG. 2, the signal transmission path within the central base station 18 originates at interface demultiplexer 104. The demultiplexer 104 separates the input serial data stream received from the input line 22 into payload (e.g., voice traffic), and control data streams. The control data stream is provided to the controller 70, and the channelized payload data streams are provided to a set of forward link modulators 108. In addition, forward link control channel data is furnished by the control channel transceiver 98 to a control channel modulator 110. Since only digital information is typically transmitted over the control channel, the control channel modulator 110 will generally be adapted to perform only digital modulation.

The forward link modulators 108 are disposed to operate in one of two modes. In particular, the modulators 108 modulate a baseband carrier signal using either: (i) voice information from demultiplexer 104, or (ii) control information from controller 70. In an exemplary embodiment the modulators 108 utilize well-known digital signal processing (DSP) techniques to perform this frequency modulation. During the brief periods of message data transmission over a voice channel (e.g., within an AMPS system) is required, the modulation format will temporarily change to binary frequency-shift keyed (FSK) from the nominal FM modulation format. Since each modulator 108 produces an output having a bandwidth approximately equivalent to a single forward link channel (e.g., 30 kHz within AMPS), the sample rate at the output of each modulator 108 is selected to be at least twice the channel bandwidth in order to prevent aliasing (e.g., at least 83.3 ksps).

As is indicated by FIG. 2, the modulated output from each modulator 108 and 110 is provided to a corresponding forward link digital transmitter 114. Each digital transmitter 114 upconverts the frequency of one of the modulated sample streams to a unique frequency slot within a predetermined intermediate frequency (IF) band. In an exemplary embodiment, each digital transmitter 114 produces an IF output at a unique frequency within an IF band extending from 0.5 to 10.5 MHz. Since in an exemplary embodiment the sample rate into each digital transmitter 114 is approximately 83.3 ksps, interpolation is required to increase the sample rate to at least 21 MHz in order to avoid aliasing of the IF outputs, with 25 MHZ being chosen for the exemplary embodiment. As discussed below, within the remote site station 14*a* these IF signals are converted to analog signals and further upconverted to signals within the forward link cellular band. Accordingly, the base station controller 70 is able to allocate the modulated output of each modulator 108 and 110 to a desired channel by specifying the IF frequency slots (e.g., between 0.5 and 10.5 MHz) into which the modulated outputs are to be placed by the digital transmitters 114.

In a simplified embodiment, each TX beamformer 118 functions to select only certain IF frequencies for transmission to each remote site station. That is, the selected frequencies are weighted with a "1", and frequencies not selected for transmission to a given remote site station are weighted with a "0". However, in alternate embodiments the TX beamformers may be configured to cause a given frequency to be transmitted by more than one remote site station. This situation may arise when, for example, the mobile unit assigned to a particular frequency is proximate the boundary between a pair of subcells.

Each TX beamformer 118 provides a 12-bit wide stream of data at an exemplary 25 MHz rate to one of the forward channel communication link transmitters 58*a*–58*f*. Each transmitter 58*a*–58*f* is coupled to a corresponding remote site station 14*a*–14*f* through a forward link line 56*a*–56*f*. When the forward link lines 56*a*–45*f* are realized as optical fibers, the forward channel communication link transmitters 58*a*–58*f* include laser transmitters disposed to be modulated by a serial data stream derived from the 12-bit wide data streams from the TX beamformers 118. The modulated optical output from each laser transmitter is applied to the forward link lines 56*a*–56*f* for transmission to the forward channel communication link receivers respectively disposed within the remote site stations 14*a*–14*f*.

The base station controller 70 is disposed to regulate communication with the MTSO 20, as well as to oversee operation of each remote site station 14 within the macrocell 10. In this regard the base station controller 70 is designed to "appear" to the MTSO 20 as would the controller of a standard macrocell base station, thereby obviating the need for any significant modification of data processing resources within the MTSO 20. Although appearing in the usual way to the MTSO 20, the base station controller 70 is capable of performing functions (e.g., frequency channel hand-offs between mobile units) heretofore not executed within macrocell base stations. That is, the base station controller 70 is designed to effect a variety of control functions in a manner transparent to the MTSO 20. As a consequence, system capacity may be increased without undertaking expensive augmentation or modification of existing MTSO signal processing resources.

As mentioned above, one function performed by the base station controller 70 relates to the monitoring of the quality of the composite frequency modulated carrier from one or more RX beamformers 90. By monitoring this parameter, the base station controller 70 is able to determine whether the remote site stations are collectively able to produce a useable signal. Hence, the base station controller is able to decide when to request that the MTSO initiate handoff of the mobile unit to another macrocell based on the signal quality produced by the RX beamformers 90.

The base station controller 70 is also configured to orchestrate call hand-offs between the remote site stations 14*a*–14*f* so that as the mobile unit moves throughout the macrocell 10 the most suitable remote site station transmits to mobile unit The determination as to which of the remote site stations 14*a*–14*f* is the most suitable for transmitting to the mobile unit is made by monitoring the quality of the signal received from the mobile unit at the remote site stations. This function is integrated within each RX beamformer 90, 92 which assesses the quality of the signal on each of its inputs in order to determine the weighting to be applied to those inputs. This information produced in the RX beamformers can be used to determine the weights which are applied within the TX beamformers.

For example, if one of the RX beamformers determines that remote site station 14*a* is receiving a very strong signal from the mobile unit on its corresponding frequency channel, then the RX beamformer will weight the input from channelizer 66*a* more heavily than the input from the other channelizers. Knowing that remote site station 14*a* is receiving a better quality signal from the mobile unit than any of the other remote site stations the controlled chooses to transmit to that mobile unit from remote site station 14*a*. The TX beamformer 118 connected to communications link interface 58*a* applies a weight of "1" to its input from the digital transmitter 114 which corresponds the frequency channel in use by the mobile unit. The other TX beamformers weight their inputs from that particular digital transmitter with a "0", effectively preventing transmission from remote site stations 14*b*–14*f*.

It is expected that the remote site station 14*a*–14*f* identified by the base station controller 70 to be best able of communicating with a given mobile unit may occasionally not be in communication with the mobile unit. Moreover, the identified remote site station 14a–14f may not be currently assigned for operation upon the frequency channel to which the mobile unit is tuned according to the network frequency planning scheme. Under these circumstances, the base station controller 70 may initiate a "hard" hand-off procedure during which the mobile unit is commanded by the remote site station 14a–14f currently in communication therewith to tune to a new frequency channel assigned to the new remote site station 14a–14f. In the case of a TDMA system, the mobile unit is also assigned to given time slot on the new frequency channel.

In the exemplary embodiment these hand-off instructions are provided to the mobile unit via a FOVC data message. The base station controller 70 then (i) commands the appropriate digital transmitter to become tuned to a new frequency, (ii) adjusts one or more TX beamformers as necessary to initiate change transmission from the remote site stations involved in the hand-off, and (iii) informs the MTSO at a convenient later time that a hard hand-off has occurred. It is observed that hard hand-offs between remote site stations 14a–14f are effected in a manner which is transparent to the MTSO. In this way cell capacity may be advantageously increased by deploying additional remote site stations in a manner which does not strain existing processing capability of the MTSO.

As is indicated by FIG. 2, the control channel transceiver 98 receives demodulated reverse control channel data (RECC) from the demodulator 96. This information is forwarded to the base station controller 70, which interprets the RECC data in order to process calls in accordance with standard protocols. In addition, the base station controller 70 also generates the control messages transmitted over each forward control channel (FOCC) by the remote site stations 14a–14f. In the exemplary embodiment each remote site station 14a–14f simultaneously transmits identical FOCC information, thereby ensuring that the FOCC information is uniformly disseminated throughout the entire macrocell 10.

Figure 4:
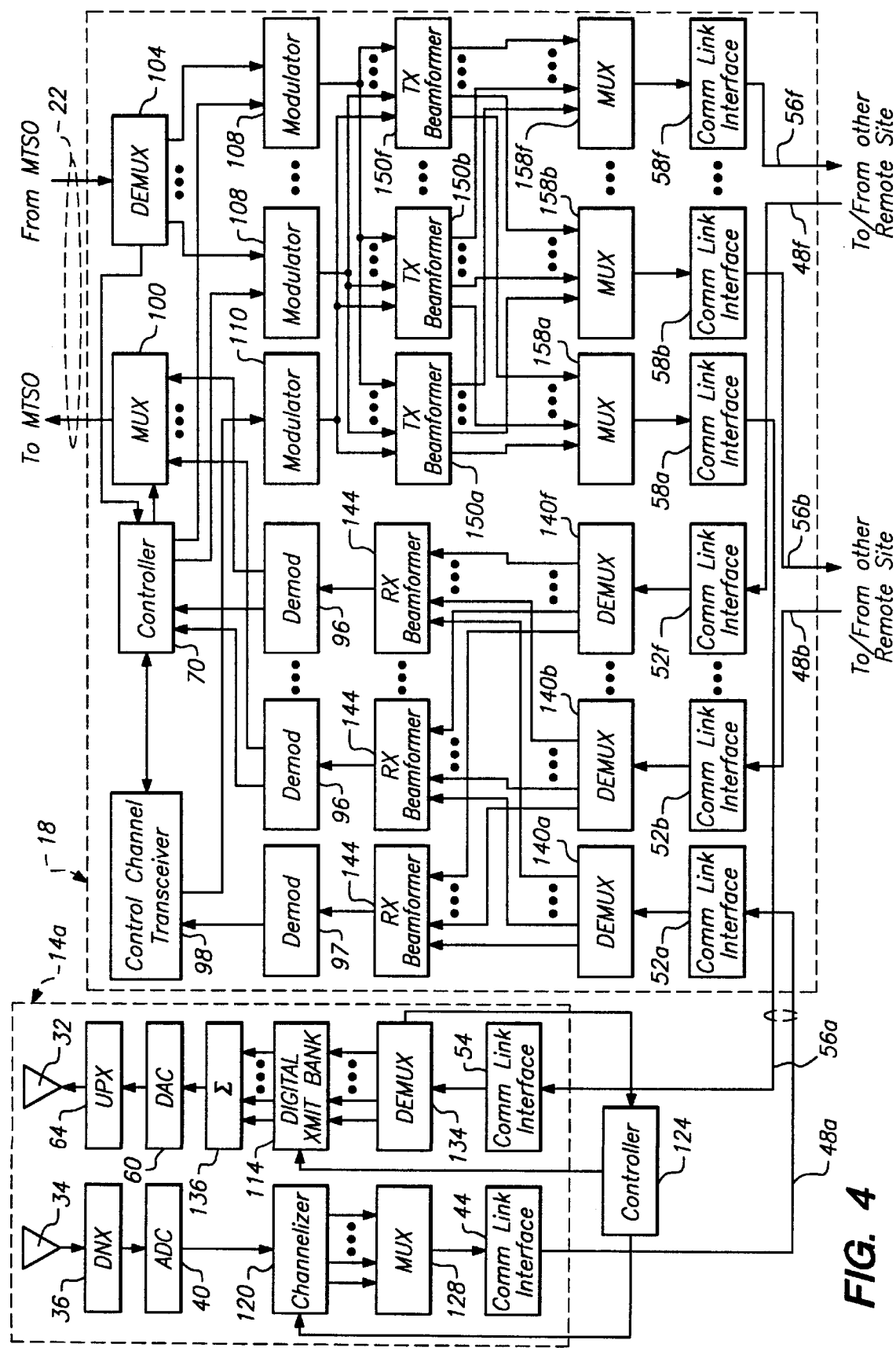
FIG. 4 provides a block diagrammatic representation of an embodiment of the communication system of the invention in which a channelizing function is performed at each remote site station.

Referring to FIG. 4, a block diagrammatic representation is provided of an embodiment of the communication system of the invention in which a channelizing function is performed at the remote site station. In FIGS. 2 and 4, like reference numerals are used to identify those processing elements performing substantially similar functions. Within the remote site station 14a, signals received by the RX antenna 34 are applied to frequency downconverter (DNX) 36 and translated to a lower frequency range. The downconverted reverse channel spectrum is sampled by analog to digital converter (ADC) 40 at a sampling rate of at least twice the highest frequency produced by the DNX 36.

The sampled, frequency-downconverted reverse channel spectrum produced by the ADC 40 is provided to a remote site channelizer 120. The remote site channelizer 120 functions to extract the digitized channel information corresponding to receive channels present within the reverse link cellular frequency spectrum. The extracted channel information is divided into separate, parallel data streams, each of which occupies a bandwidth consistent with the channel spacing of a particular cellular system (e.g., 30 klHz for AMPS). The parallel data streams corresponding to the channels extracted by the channelizer 120 are combined by a remote site multiplexer 128 into a serial data stream, which is provided to the reverse channel communication link transmitter 44.

In the exemplary embodiment the remote site channelizer 120 is instructed by the remote site controller 124 as to which channels are to be extracted from the received reverse channel spectrum. The channels specified by the remote site controller 124 for extraction by the channelizer 120 will nearly always include at least those channels assigned to mobile units in the subcell of the remote site station. Additionally, in order to facilitate RX beamforming at the central base station the extracted channels may also comprise those assigned to mobile units in surrounding subcells. Finally, the extracted channels may also correspond to those under evaluation for hand-off either to another macrocell, or to the remote site station within an adjacent subcell.

Figure 5:
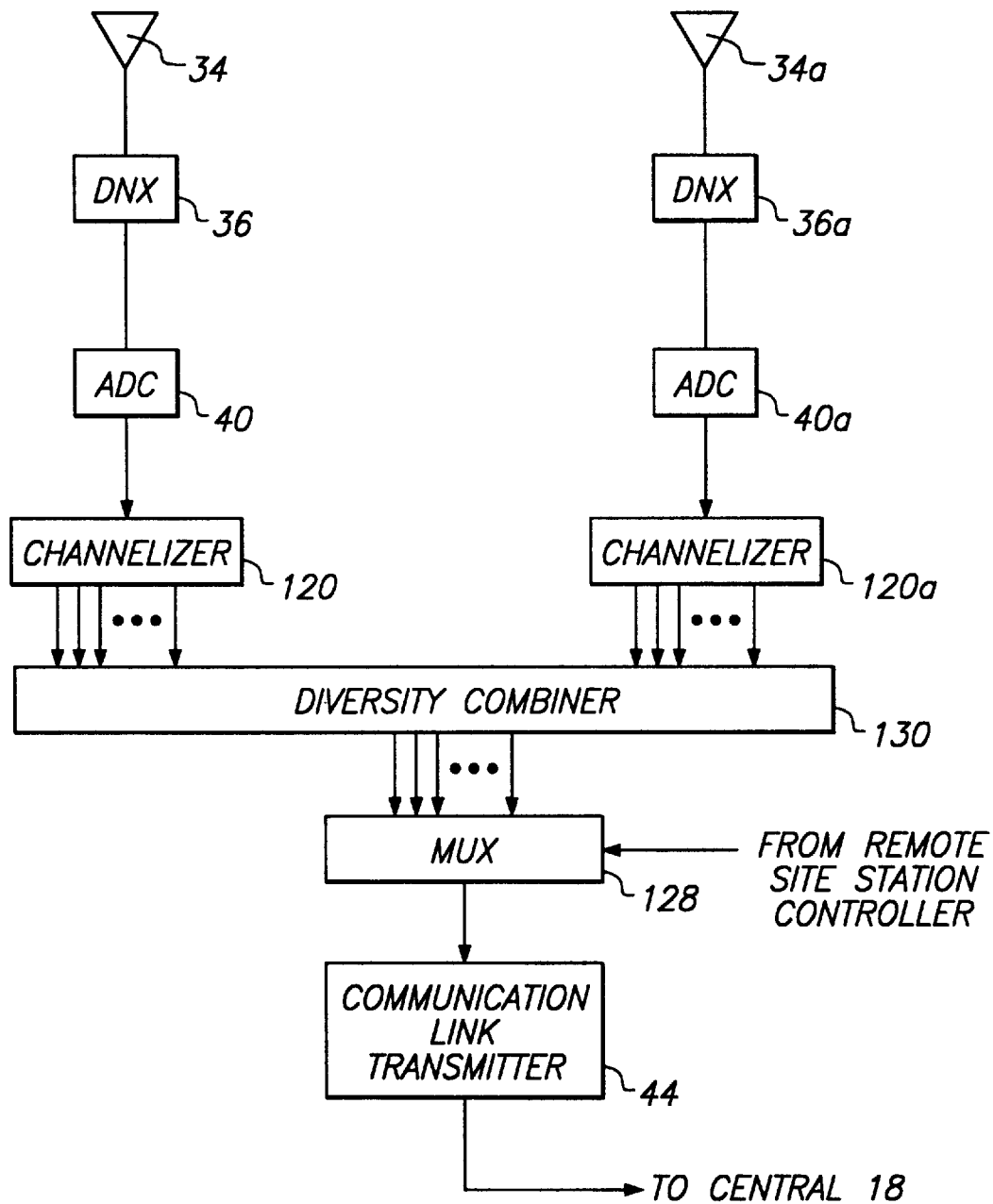
FIG. 5 depicts the manner in which a remote site station may be configured for diversity reception by including therein more than one separate receive path.

As is shown in FIG. 5, the remote site station 14a may be configured for diversity reception by including therein one or more separate receive paths. In particular, the remote site station 14a may optionally include a second RX antenna 34a, a second DNX 36a, a second ADC 40a and a second remote site channelizer 120a. The outputs of the remote site channelizers 120 and 120a are combined using conventional techniques within a diversity combiner 130, and the resultant set of parallel data streams provided to the multiplexer 128. The remote site configuration of FIG. 5 enables "microdiversity" reception over the subcell covered by the remote site station 14a without the necessity of separate transmission, to the central base station, of the reverse link spectrum received by different remote site antennas.

While FIG. 5 shows a remote site implementation capable of performing conventional microdiversity using a pair a receive antennas, the concept can be extended to the combination of signals captured by an antenna array with 3 or more antennas. For each additional antenna, by using sophisticated signal processing techniques, a improvement in received signal quality can be realized. The advantage of implementing remote site antenna combining therefore becomes even more dramatic since, if the antenna combining were to be performed at a central site, that would necessitate relaying M (where M is the number of remote site receive antennas) copies of the reverse link spectrum to the central site over the communications link connecting the central site to the remote site station.

Referring again to FIG. 4, a remote site station demultiplexer 134 is disposed to divide the serial TDM data stream produced by the forward communication link receiver 54 into a set of parallel data streams provided to a bank of digital transmitters 114. Each digital transmitter 114 is assigned to one of the frequency channels in use by the remote site station 14a, and the output of each is combined within a digital adder 136 and forwarded to the DAC 60. Distribution of frequency channels among the digital transmitters 114 is effected by the digital transmitter bank 114 pursuant to instructions from the remote site controller 124. The demultiplexer routes channel frequency information, contained within a predetermined time slot on the data stream produced by the forward channel communications link, to the remote site controller 124. The remote site controller then sets each digital transmitter in accordance with the received channel frequency information.

In alternate implementations, information may be transmitted asynchronously over the communication link 56a in a packet format rather than in a time-division multiplexed mode. In this case the data stream from the remote forward channel communication link receiver 54 would be distributed by the demultiplexer 134 bn the basis of packet header information or the like, rather than on the basis of time slot assignment.

Directing attention now to the implementation of the central base station 18 of FIG. 4, the serial data stream produced by each reverse channel communication link receiver 52a is provided to a different reverse channel demultiplexer 140a–140f. Each demultiplexer 140a–140f demultiplexes the TDM serial stream comprised of the channels assigned to, or monitored by, a corresponding remote site station 14a–14f. The parallel data streams from each demultiplexer 140a–140f are then routed to a bank of RX beamformers 144, each of which is associated with a single receive frequency channel. That is, the data stream from each demultiplexer 140a–140f corresponding to the same frequency receive channel is provided to the same one of the RX beamformers 144.

Each RX beamformer 144 may be designed to use any of a number of available beamforming techniques to weight and combine the data streams provided thereto by the demultiplexers 140a–140f. For example, in a preferred embodiment the complex value of a weighting factor applied to each incident data stream is varied in response to changes in the propagation environment for the frequency channel corresponding to the data stream.

In a "selection diversity" approach to beamforming, the output of each RX beamformer 144 is simply equivalent to the one of its inputs having the highest signal quality. That is, the highest quality input is weighted by a factor of "1", and the remaining inputs weighted by a factor of "0". Alternately, within each RX beamformer inputs provided thereto are weighted commensurately with signal quality and combined. In this implementation, the inputs to the Rx beamformer are adjusted in phase so as to add constructively upon such combination.

The utilization of the RX beamformer 144, is expected to facilitate the process of determining when the controller 70 should issue a hand-off request to the MTSO 20. Specifically, once the signal quality associated with the output of a particular RX beamformer 144 falls below a minimum quality threshold for some predefined interval, the controller 70 initiates the hand-off process with the MTSO 20. Since each RX beamformer 144 is provided with input from each remote site station 14a–14f disposed to receive the frequency channel of interest, there exists no need to separately "poll" each remote site station with respect to signal quality prior to proceeding with the hand-off determination process.

As is indicated by FIG. 4, the central base station 18 includes a set of TX beamformers 150a–150f respectively associated with the remote site stations 14a–14f. Each TX beamformer 150a–150f receives modulated baseband signal inputs from N of the modulators 110, where N is the number of frequency channels currently being used by the associated remote site station 14a–14f. Each TX beamformer 150a–150f is also provided with an input corresponding to forward control channel (FOCC) by the control channel transceiver 98. In an exemplary embodiment, information relating to characteristics of the receive channels in use by a given remote site station 14a–14f is used to adjust a weighting vector of the TX beamformer 150a–150f associated with the given station 14a–14f.

The weighting vector of each TX beamformer 150a–150f is adjusted with sufficient regularity to ensure that the average signal power delivered to mobile units within the vicinity of each remote site station 14a–14f exceeds a predefined minimum value. It is observed that it will not typically be desirable to simply maximize the power received by each mobile unit by, for example, transmitting maximum power on every frequency channel from each remote site station 14a–14f. If this approach is taken, there will likely be many instances in which the majority of the signal power received by a mobile unit on an assigned frequency channel is supplied by a given remote site station 14a–14f, but wherein the other remote site stations nonetheless also continue to transmit on the assigned channel. This leads to unnecessary interference power being transmitted to mobile units in other cells also operating upon the assigned frequency channel.

Accordingly, in the preferred embodiment the weighting vectors of the TX beamformers 150a–150f are adjusted such that only those remote site stations 14a–14f disposed to substantially improve the quality of the signal received by a given mobile unit on an assigned frequency channel are allowed to transmit on the assigned channel. It is expected that this will result in one, or perhaps two or three, remote site stations 14a–14f being allowed to transmit upon an assigned frequency channel at any given time. In the case of the forward control channel (FOCC), the weighting vectors of the TX beamformers 150a–150f will generally be set such that each remote site station 14a–14f broadcasts the FOCC with equal strength.

Each beamformer 158a–150f respectively produces N (where N is the number of modulators 110 which are actively producing outputs) parallel data streams consisting of 12 bit samples Each of the N data streams is a weighted baseband modulated channel signal. The parallel data streams destined for each of the remote site stations 14a–14f are multiplexed, along with control information from the controller 70 in one of the associated multiplexers 158a–158f. The multiplexers 158a–158f may be programmed to forego incorporating the data on channels which have been weighted by "0" in the TX beamformers 150a–150f. The resultant serial bit streams are then respectively transmitted by the forward channel communication link transmitters 58a–58f to the remote site stations 14a–14f.

Figure 6B:
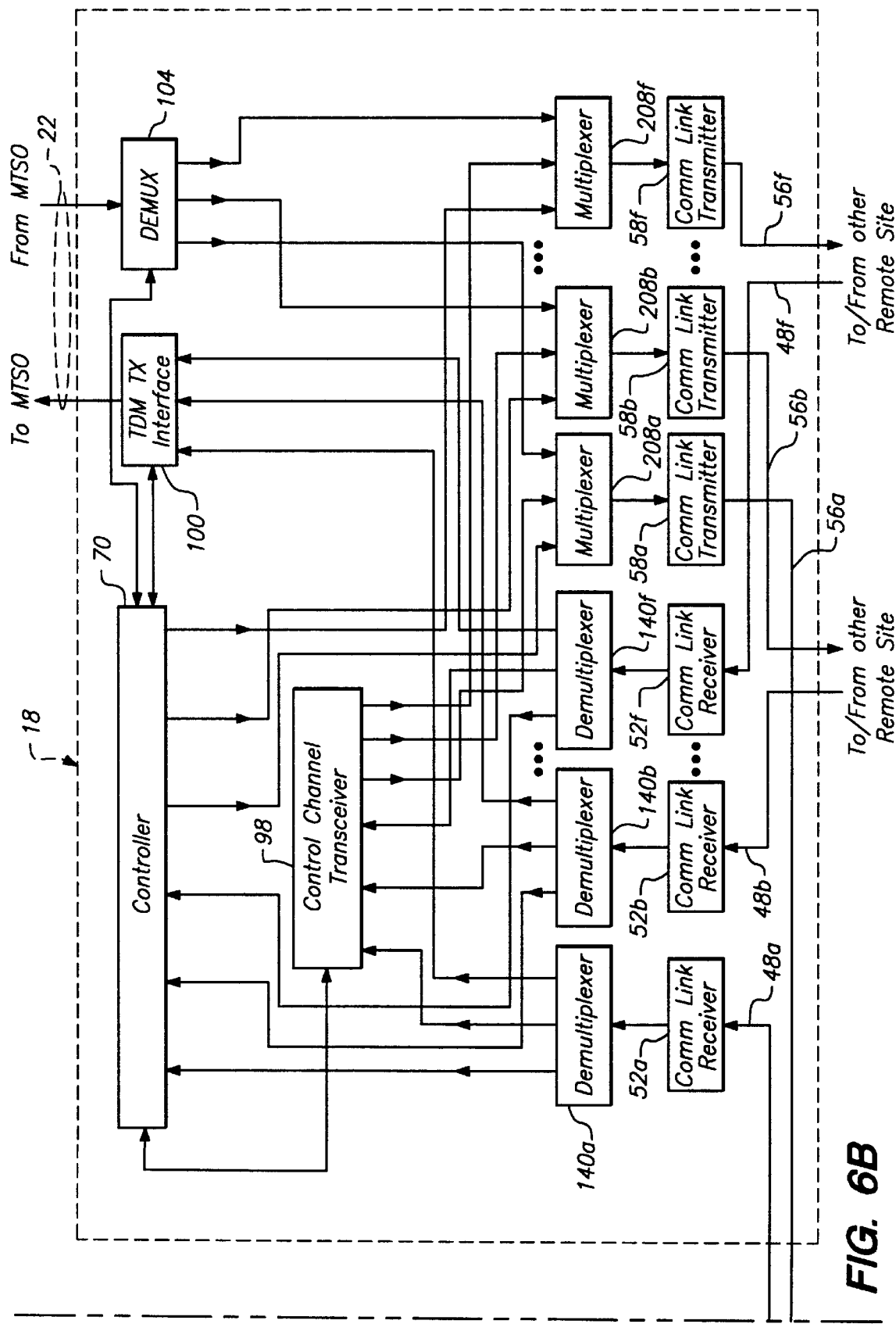
FIG. 6 is a block diagram of a distributed communication system of the invention in which both channelizing and modulation/demodulation functions are performed at each remote site station.

FIG. 6 is a block diagram of a distributed communication system in which modulation/demodulation functions, in addition to a channelizing function, are performed at the remote site station. In FIGS. 4–6, like reference numerals are used to identify those processing elements performing substantially similar functions. Within the remote site station 14a, signals received by the RX antennas 34 applied to frequency downconverter (DNX) 36 and translated to a lower frequency range. The downconverted reverse channel spectrum is sampled by the ADC 40, and the resultant sampled spectrum provided to the remote site channelizers 120.

The 12-bit data samples corresponding to the channels extracted by the channelizer 120 are each provided to a remote site demodulator 180. In the exemplary AMPS embodiment, the demodulated digital waveform produced by each demodulator 180 is comprised of an approximately 8 dHz stream of 8-bit samples. The 8-bit samples primarily comprise digitized voice information, but also represent digital control messages intermittently transmitted by mobile unit for brief periods over reverse link voice channels. Each demodulator 180 is capable of distinguishing between voice and signaling information, and operates to "tag" the signaling information in order that it may be demultiplexed from the voice information within the central base station 18.

The demodulated data streams produced by the demodulator 180 are multiplexed into a composite data stream within a remote site time division multiplexer (TDM) 190. In addition, the remote site TDM 190 also multiplexes signal quality information from a signal quality receiver 194 into the composite data stream.

The signal quality receiver 194 functions to monitor the signal quality (e.g., average received power, or signal-to-noise ratio, or fading depth or duration) of each demodulated data stream produced by the channelizer 120. Signal quality information for each channel currently assigned to, or being monitored by, the remote site station 14a is provided by the receiver 194a in the form of a serial data stream of predetermined format.

In the exemplary AMPS embodiment, the signal quality receiver 194 also monitors the reverse control channel (RECC). An indication of RECC signal quality is provided to the TDM 190 following each access of the RECC by a mobile unit. In order to facilitate call set-up with each mobile unit, the receiver 194 appends header information to each RECC signal quality measurement. The header information specifies the mobile unit responsible for transmitting the RECC over the time period during which the RECC signal quality measurement was performed. Within the central base station 18, the controller 70 uses these RECC signal quality measurements as a basis for assigning remote site(s) 14a–14f in response to call set-up requests from mobile units.

The remote site controller 202 is primarily operative to implement instructions issued by the base station controller 70 relating to calls being handled by the remote site station 14a. Included among these instructions are, for example, the RF channel assigned to each call, and the time slot of the reverse link line 48a within which is inserted the demodulated data comprising each call. The remote site controller 202 effects the first of these instructions by commanding the channelizer 120 to extract the RF channels assigned to the remote site station 14a–14f from the digitized reverse channel spectrum. In like manner the TDM 190 is informed of the time slot of the reverse link line 48a allocated to each call being processed by the remote site station 14a.

Referring now to the implementation of the central base station 18 depicted in FIG. 6, each time-division multiplexer (TDM) unit 208a–208f receives the voice data stream corresponding to a particular call from the demultiplexer 104. The demultiplexer 104 operates to distribute the time division multiplexed voice data received from the MTSO among the TDM units 208a–208f in response to control information received from the controller 70. Each TDM unit 208a–208f also receives a stream of forward control channel (FOCC) information, as well as control messages 28 generated by the base station controller 70. As is indicated by FIG. 6, the three streams of information provided to each TDM unit 208a–208f are multiplexed into a single forward channel data stream and provided to the corresponding forward channel communication link transmitter 58a–58f.

Referring again to the implementation of the remote site station 14a of FIG. 6, the forward channel communication link receiver 54 receives the forward channel data stream from the forward channel communication link transmitter 58a and forwards it to a remote site station TDM demultiplexer 218. The TDM demultiplexer 218 extracts the voice/data information corresponding to each call from the appropriate time slot of the received forward channel data stream. The extracted information is then distributed among a bank of digital modulators 222, which function substantially identically to the modulators 110 (FIG. 4). The modulated data from the bank of digital modulators 222 is then processed by the digital transmitters 114, as well as by the remaining elements within transmit section of the remote site station 14a, in the manner described previously with reference to FIG. 4.

Figure 7B:
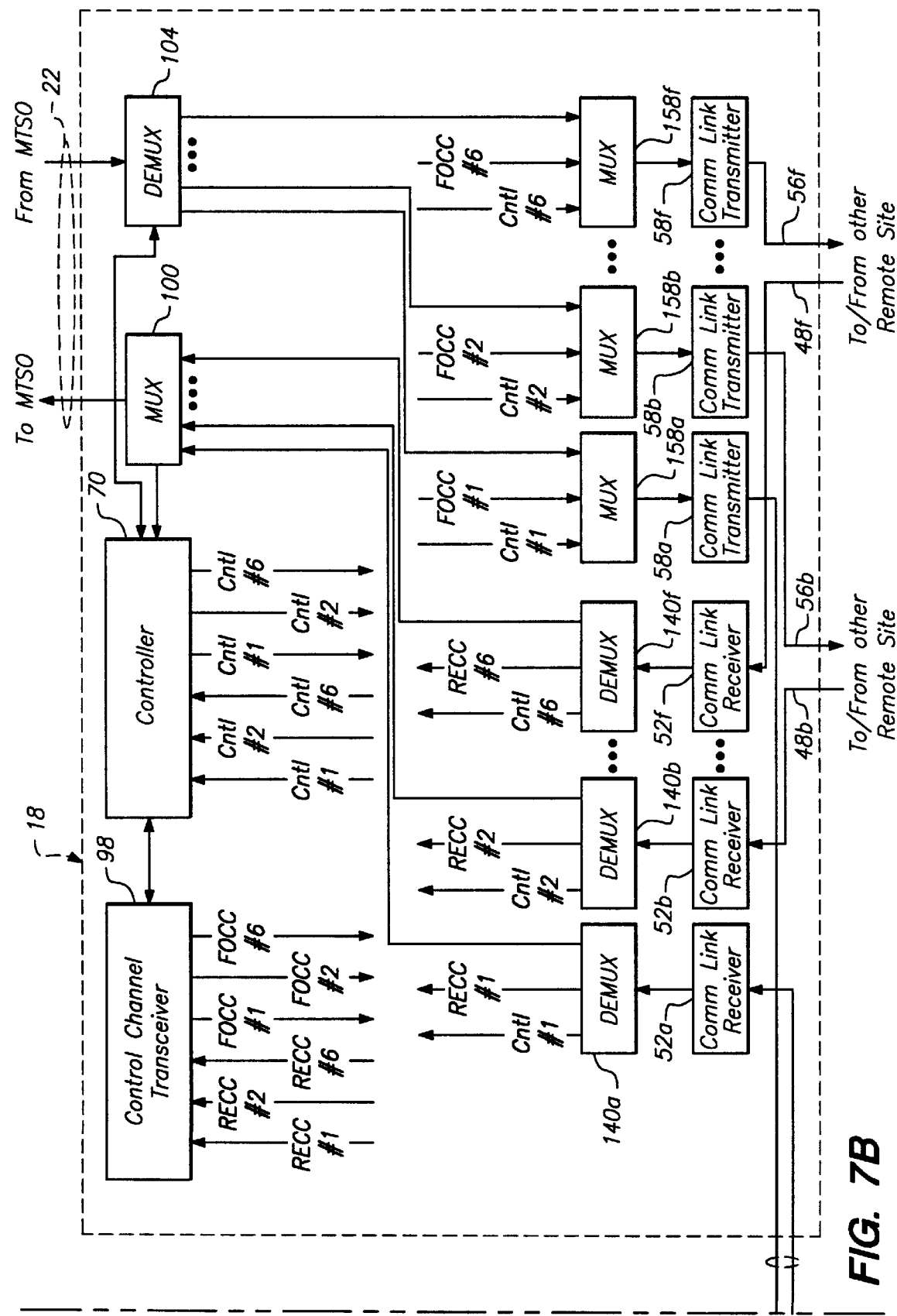
FIG. 7 is a block diagram of a distributed communication system which is similar to the system of FIG. 6, but which is different in that a beamformer function is performed at the remote site station.

FIG. 7 is a block diagram of a distributed communication system in which modulation/demodulation, channelizing, and beamformer function are performed at the remote site station. Again, like reference numerals are used to identify those processing elements within FIG. 7 performing functions substantially identical to those previously described. Within the remote site station 14a, signals received by the RX antennas 34 and 34a are respectively applied to frequency downconverters (DNX) 36 and 36a and translated to a lower frequency range. The downconverted reverse channel spectra are respectively sampled by the ADCs 40 and 40a, and the resultant sampled spectra provided to the remote site channelizers 120 and 120a.

Each channelizer 120 and 120a produces a data stream corresponding to each received frequency channel, and the pair of data streams for each channel are provided by the channelizers 120 and 120a to an associated one of the remote site beamformers 252. In the exemplary embodiment of FIG. 7, each beamformer 252 functions to provide either selection diversity or adaptive beamforming. In the former case the beamformer 252 simply weights the highest quality data stream provided thereto by a factor of "1", and weights any other data streams upon the same frequency channel with a factor of "0". When adaptive beamforming is employed, each data stream is weighted in accordance with signal quality and the weighted streams subsequently combined. Similarly, TX beamforming (e.g. adaptive or selection) may be implemented for forward link transmissions. While two antennas are depicted in FIG. 7 for reception and transmission respectively, antenna arrays of more than two elements may be used. Also, those skilled in the art will recognize that a single antenna array may be shared for reception and transmission through the use of diplexers.

Figure 8:
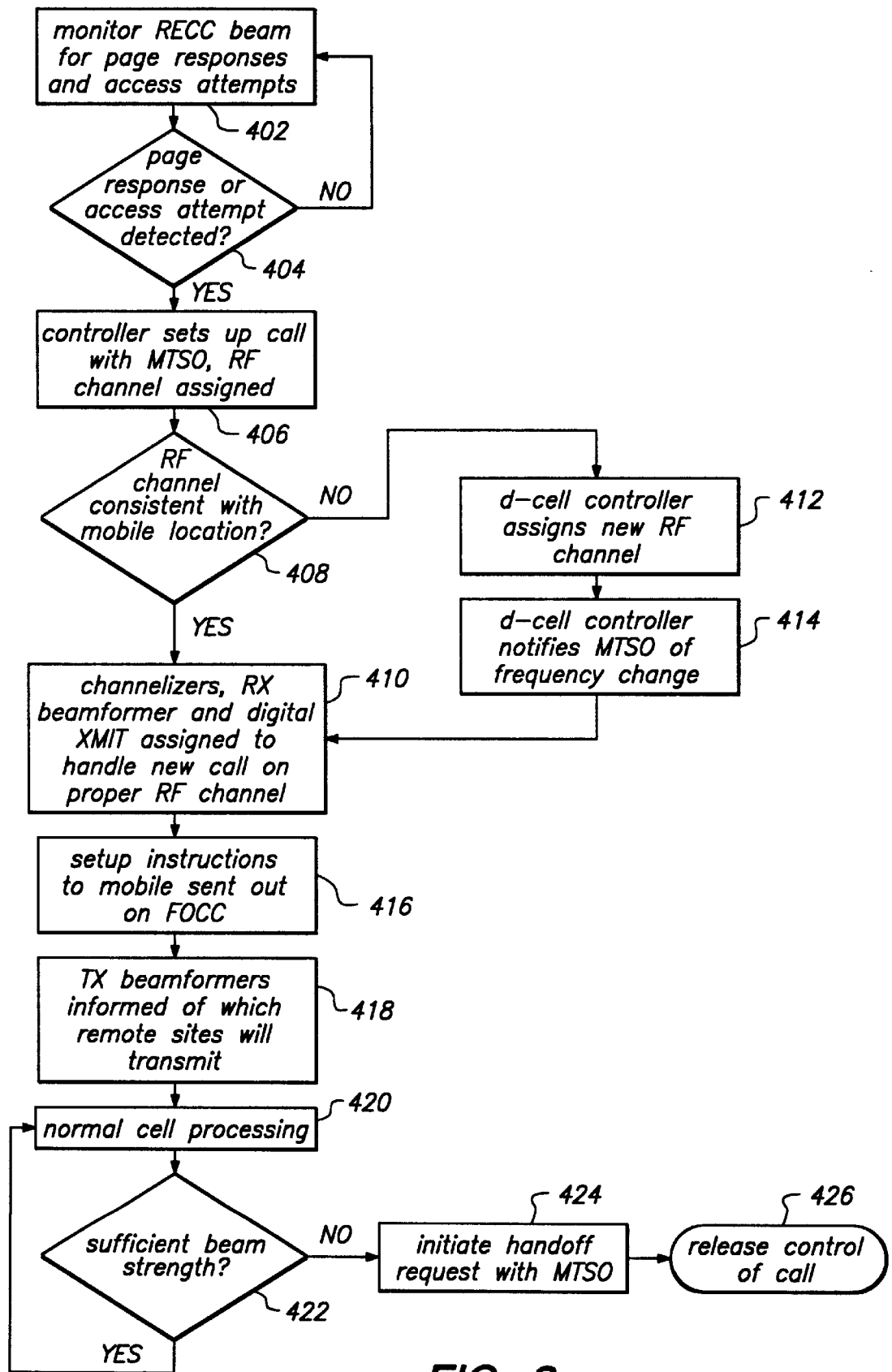
FIG. 8 is a flowchart representative of an exemplary manner in which calls are processed in accordance with the invention.

FIG. 8 is a flowchart representative of an exemplary manner in which calls are processed in accordance with the invention. As is indicated by FIG. 8, the RECC is monitored for the presence of page responses or access attempts received from mobile units by one or more remote sites (step 402). Upon detection of a page response or access attempt (step 404), the controller 70 informs the MTSO and is assigned an RF channel thereby (step 406). It is then determined if the remote site station best able to establish communication with the mobile unit has been allocated the RF channel assigned by the MTSO (step 408). If so, the above-described call processing hardware (e.g., channelizers, beamformers, digital transmitters) within the central and remote site stations are configured for operation on the assigned RF channel (step 410). If not, the controller 70 assigns a different RF channel to the mobile unit (step 412) and informs the MTSO of the change in channel frequency (step 414).

Once a suitable RF channel has been assigned and the central and remote site stations have been appropriately configured, call set-up instructions are sent to the mobile unit over the FOCC (step 416). In embodiments in which transmit (TX) beamforming capability is provided, the TX beamformers are adjusted so as to maximize the transmit power to the mobile unit (step 418). Call processing then proceeds in accordance with standard protocols (step 420), during which time the quality of the communication link to the mobile unit is monitored (step 422). This link quality monitoring may be performed within the mobile unit in some cellular standards, in which case signal quality information would be provided by the mobile unit to the remote site station(s) in communication therewith. Alternately, the remote site station(s) are configured with a signal quality receiver 194 (FIGS. 6 and 7) designed to monitor a given quality metric (e.g., signal to noise ratio). If TX and/or RX beamforming techniques prove incapable of maintaining the requisite signal quality, a hand-off request is issued to the MTSO (step 424) and control of the call is subsequently released in the usual way (step 426).

While the present invention has been described with reference to a few specific embodiments, the description is illustrative of the invention and is not to be construed as limiting the invention. Various modifications may occur to those skilled in the art while remaining within the spirit and scope of the invention as defined by the appended claims.

What is claimed is:

1. A distributed microcellular communications system divided into a plurality of contiguous cells and for communicating with a plurality of mobile stations comprising:

a remote site station including:

a remote radio transceiver configured to communicate information signals with said mobile stations over an assigned set of communications channels within a first subcell within one of said cells;

(b) a converter configured to convert information signals received by said remote radio transceiver into reverse link information signals corresponding to said assigned set of communications channels;

(c) a remote link transceiver configured to transmit said reverse link information signals and to receive forward link information signals; and (d) a channelizer configured to select a set of said reverse link information signals corresponding to said assigned set of communications channels; and (e) wherein said remote link transceiver is configured to transmit said set of reverse link information signals corresponding to said assigned set of communications channels; and a central base station having a central link transceiver and configured to receive said reverse link information signals from said remote site station and to transmit said forward link information signals to said remote site station.

2. The distributed microcellular communications system of claim 1 further comprising:

a controller configured to allocate said assigned set of communications channels from an available set of communications channels.

3. The distributed microcellular communications system of claim 1, further comprising:

a second remote site station including:

a second remote radio transceiver configured to communicate information signals with said mobile stations over a second assigned set of communications channels within a second subcell within said one of said cells;

(b) a second converter configured to convert information signals received by said remote radio transceiver to second reverse link information signals corresponding to said second assigned set of communication channels;

(c) a second remote link transceiver configured to transmit said second reverse link information signals and to receive second forward link information signals; and (d) a second channelizer configured to select said reverse link information signals corresponding to said second assigned set of communications channels, and wherein said second remote transceiver is configured to transmit said second reverse link information signals corresponding to said second assigned set of communications channels; and wherein said central link transceiver is configured to receive said second reverse link information signals from said second remote site station and to transmit said second forward link information signal to said second remote site station.

4. The distributed microcellular communications system of claim 3 further comprising:

a controller configured to allocate said assigned set of communications channels from an available set of communications channels and to allocate said second assigned set of communications channels from a second available set of communications channels.

5. The distributed microcellular communications system of claim 1 wherein maid remote site station further includes a multiplexer, interposed between said channelizer and said remote link transceiver and configured to multiplex said set of said reverse link information signals corresponding to said assigned set of communications channels into a reverse link said data stream.

6. The distributed microcellular communications system of claim 1 wherein said channelizer further includes a selector to select other ones of said reverse link information signals, said remote site station further including a signal quality monitoring module for monitoring signal quality of said communications channels corresponding to said other ones of said reverse link information signals.

7. The distributed microcellular communications system of claim 1 wherein said remote site station further includes:

a demodulator configured to demodulate said set of said reverse link information signals to produce a set of demodulated reverse link information signals; and wherein said remote link transceiver is configured to transmit said set of demodulated reverse link information signals.

8. The distributed microcellular communications system of claim 7 wherein said remote site station father includes a plurality of beamformers disposed to receive said set of reverse link information signals, said demodulator including a corresponding plurality of demodulators coupled to said plurality of beamformers.

9. The distributed microcellular communications system of claim 1 wherein said remote site station further includes:

a modulator configured to modulate a carrier signal with said forward link information signals, thereby producing a plurality of modulated carrier signals; and a translater configured to translate a frequency of said plurality of modulated carrier signals in order that each of said signal occupies an assigned frequency channel within a digitized forward link transmission spectrum.

10. The distributed microcellular communications system of claim 9 wherein said translator includes:

a plurality of digital transmitters each configured to modulate one of said carrier signals with one of said forward link information signals;

a digital to analog convertor; and a digital summer interposed between said digital to analog converter and said plurality of digital transmitters.

11. The distributed microcellular communications system of claim 9 wherein said remote site station further includes a wideband transmitter configured to translate a frequency of said modulated carrier signals into a frequency-shifted forward link transmission spectrum.

12. The distributed microcellular communications system of claim 1 wherein said converter includes;

a wideband receiver for translating frequency of said information signals received by said transceiver to a frequency-shifted reverse channel spectrum, and an analog to digital converter coupled to said wideband receiver.

13. In a cellular system including at least a first cell having a cell-site, a distributed microcellular communications system comprising:

a remote site station including:
- (a) a wideband receiver for receiving reverse link information signals from users within a first subcell of said first cell, and for converting frequency of said reverse link information signals into a frequency-shifted reverse link spectrum so as to produce frequency-shifted reverse link information signals,
- (b) an analog to digital converter for converting said frequency-shifted reverse link information signals into a plurality of reverse link digital information signals;
- (c) a channelizer for selecting ones of said reverse link digital information signals corresponding to channel frequencies assigned to said remote site station, and
- (d) a remote communications link transmitter for transmitting said reverse link digital information signals; and a central base station, located at said cell-site, having a central communications link receiver for receiving said reverse link digital information signals.

14. The distributed microcellular communications system of claim 13 wherein said central base station further includes a central radio transceiver for transmitting and receiving information signals within a second subcell of said first cell, said communications system further including control means allocating selected ones of an available set of communications channels to said channel frequencies assigned to said remote site station and for allocating remaining ones of said available set of communications channels for use by said central radio transceiver.

* * * * *